(12) United States Patent
Kim et al.

(10) Patent No.: US 12,222,753 B2
(45) Date of Patent: *Feb. 11, 2025

(54) DISPLAY DEVICE

(71) Applicant: LG ELECTRONICS INC., Seoul (KR)

(72) Inventors: Sanghoon Kim, Seoul (KR); Kangyeung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,761

(22) Filed: Sep. 11, 2023

(65) Prior Publication Data

US 2023/0418326 A1 Dec. 28, 2023

Related U.S. Application Data

(63) Continuation of application No. 18/132,116, filed on Apr. 7, 2023.

(30) Foreign Application Priority Data

Apr. 8, 2022 (KR) ........................ 10-2022-0044093

(51) Int. Cl.
*G06F 1/16* (2006.01)
*F16M 11/04* (2006.01)
*F16M 11/06* (2006.01)

(52) U.S. Cl.
CPC ............ *G06F 1/1607* (2013.01); *F16M 11/04* (2013.01); *F16M 11/06* (2013.01); *G06F 1/1601* (2013.01); *G06F 1/166* (2013.01)

(58) Field of Classification Search
CPC ...... G06F 1/1601; G06F 1/1607; G06F 1/166; F16M 11/00; F16M 11/02; F16M 11/04; F16M 11/06; F16M 11/08; F16M 11/10; Y10S 248/924
See application file for complete search history.

(56) References Cited

U.S. PATENT DOCUMENTS

| 6,229,584 | B1 * | 5/2001 | Chuo | G06F 1/1601 |
| | | | | 345/905 |
| 6,268,997 | B1 * | 7/2001 | Hong | F16M 11/10 |
| | | | | 248/398 |
| 6,816,364 | B2 * | 11/2004 | Helot | G06F 1/1601 |
| | | | | 248/920 |

(Continued)

FOREIGN PATENT DOCUMENTS

KR 100852663 B1 * 8/2008

*Primary Examiner* — Nidhi Thaker
(74) *Attorney, Agent, or Firm* — LEE, HONG, DEGERMAN, KANG & WAIMEY

(57) ABSTRACT

Disclosed is a display device. The display device of the present disclosure may include: a display panel; a frame positioned behind the display panel; a back cover covering a rear of the frame and having a hole; and an articulated connector coupled to the frame through the hole of the back cover, wherein the articulated connector may include: a cable reel on which a cable is wound, the cable reel spaced from a boundary of the hole to an inside of the hole; an inner cover covering a rear of the cable reel and fixed to the cable reel; and an outer cover positioned between a perimeter of the inner cover and the boundary of the hole of the back cover and coupled to the inner cover.

15 Claims, 35 Drawing Sheets

(56) References Cited

U.S. PATENT DOCUMENTS

| | | | | |
|---|---|---|---|---|
| 7,459,634 | B2* | 12/2008 | Martin | G06F 1/1603 |
| | | | | 248/920 |
| 7,798,457 | B2* | 9/2010 | Chih | F16M 11/2021 |
| | | | | 361/679.02 |
| 10,948,946 | B2* | 3/2021 | Borloz | F16M 11/2064 |
| 10,955,873 | B1* | 3/2021 | Godfrey | H05K 5/0234 |
| 11,068,022 | B2* | 7/2021 | So | H05K 7/1401 |
| 11,991,846 | B2* | 5/2024 | Wallace | H01R 13/639 |
| 12,092,258 | B1* | 9/2024 | Agalgaonkar | F16M 11/041 |
| 2001/0023914 | A1* | 9/2001 | Oddsen, Jr. | F16M 13/02 |
| | | | | 248/274.1 |
| 2006/0124804 | A1* | 6/2006 | Lin | F16M 11/22 |
| | | | | 248/65 |
| 2006/0203436 | A1* | 9/2006 | Hwang | F16M 11/2014 |
| | | | | 361/679.02 |
| 2007/0290102 | A1* | 12/2007 | Kim | F16M 11/22 |
| | | | | 248/176.1 |
| 2009/0079665 | A1* | 3/2009 | Moscovitch | F16M 11/10 |
| | | | | 345/1.3 |
| 2009/0153770 | A1* | 6/2009 | Martin | H02G 3/32 |
| | | | | 361/679.21 |
| 2012/0162949 | A1* | 6/2012 | Han | G06F 1/1601 |
| | | | | 361/803 |
| 2013/0294018 | A1* | 11/2013 | Mochizuki | F16M 11/10 |
| | | | | 361/679.01 |
| 2013/0321992 | A1* | 12/2013 | Liu | E05D 11/08 |
| | | | | 361/679.01 |
| 2021/0317945 | A1* | 10/2021 | Kim | G06F 1/181 |
| 2023/0280800 | A1* | 9/2023 | Saito | G06F 1/1643 |
| | | | | 361/679.01 |

* cited by examiner

DISPLAY DEVICE

CROSS-REFERENCE TO THE RELATED APPLICATIONS

This application is a continuation of U.S. patent application Ser. No. 18/132,116, filed on Apr. 7, 2023, which claims the benefit of earlier filing date and right of priority to Korean Patent Application No. 10-2022-0044093, filed on Apr. 8, 2022, the contents of which are all hereby incorporated by reference herein in their entirety.

BACKGROUND OF THE INVENTION

1. Field of the Invention

The disclosure relates to a display device.

2. Description of the Related Art

As the information society develops, the demand for display devices is also increasing in various forms. In response to this, various display devices such as Liquid Crystal Display Device (LCD), Plasma Display Panel (PDP), Electroluminescent Display (ELD), Vacuum Fluorescent Display (VFD), and Organic Light Emitting Diode (OLED) have been researched and used in recent years.

Among them, a LCD panel includes a TFT substrate and a color substrate facing each other with a liquid crystal layer interposed therebetween, and can display an image by using light provided from a backlight unit. In addition, an OLED panel can display an image by depositing an organic material layer capable of self-emitting light on a substrate on which a transparent electrode is formed.

Recently, many studies have been conducted on a structure for freely adjusting the angle or location of a display panel.

SUMMARY OF THE INVENTION

It is an objective of the present disclosure to solve the above and other problems.

Another object of the present disclosure may be to provide a display device including a stand of display panel.

Another object of the present disclosure may be to provide a structure capable of freely adjusting the angle or location of a head including a display panel.

Another object of the present disclosure may be to provide a structure capable of independently implementing various motions of a display panel, such as a pivot motion, a tilt motion, a swivel motion, and an elevating motion.

Another object of the present disclosure may be to provide a structure capable of winding a cable on a cable reel of an articulated connector that implements various motions.

Another object of the present disclosure may be to provide a detachable outer cover covering a cable path around a cable reel, thereby improving work convenience such as a cable dislocation.

In accordance with an aspect of the present disclosure, a display device may include: a display panel; a frame positioned behind the display panel; a back cover covering a rear of the frame and having a hole; and an articulated connector coupled to the frame through the hole of the back cover, wherein the articulated connector may include: a cable reel on which a cable is wound, the cable reel spaced from a boundary of the hole to an inside of the hole; an inner cover covering a rear of the cable reel and fixed to the cable reel; and an outer cover positioned between a perimeter of the inner cover and the boundary of the hole of the back cover and coupled to the inner cover.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
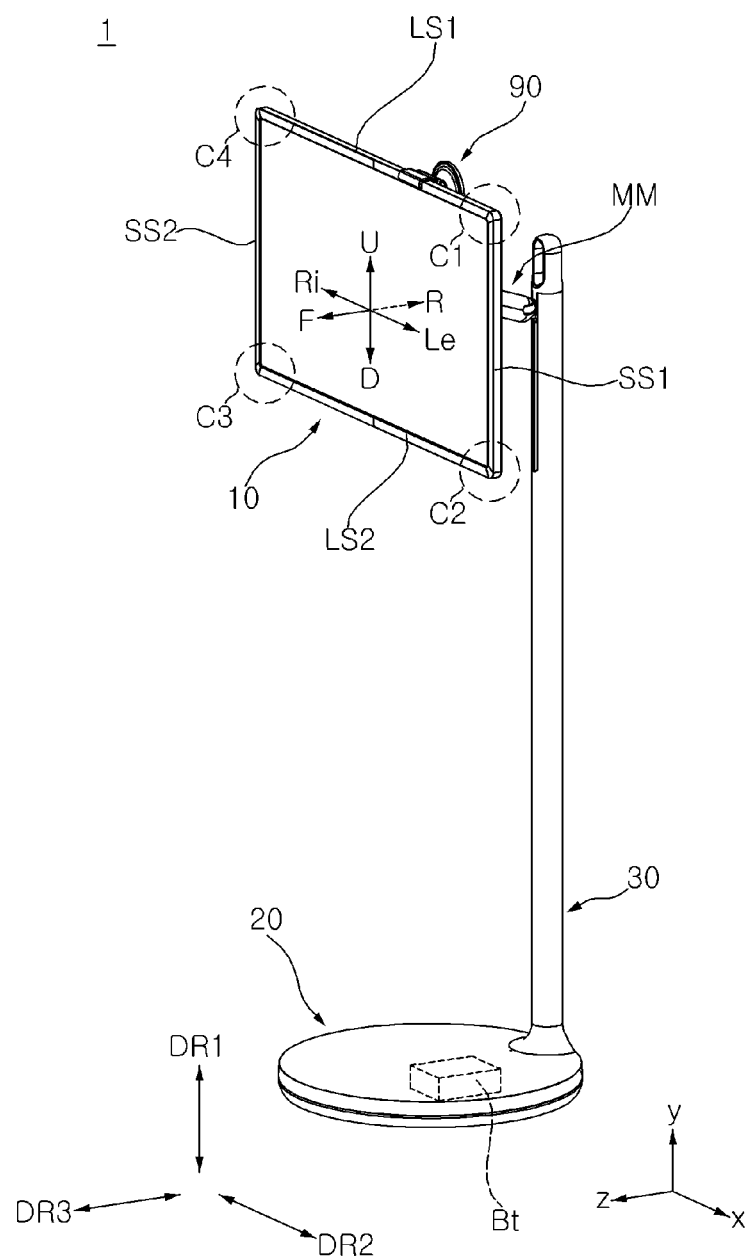
FIGS. 1 to 35 are diagrams illustrating examples of a display device according to embodiments of the present disclosure.

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

Direction indications of up (U), down (D), left (Le), right (Ri), front (F), and rear (R) shown in the drawings are for convenience of description, and the technical concept disclosed in this specification is not limited thereto.

Referring to FIG. 1, a display device 1 may include a head 10. The head 10 may display an image. The head 10 may be referred to as a display 10 or a display unit 10.

The head 10 may include a first long side LS1, a second long side LS2 opposite to the first long side LS1, a first short side SS1 adjacent to the first long side LS1 and the second long side LS2, and a second short side SS2 opposite to the first short side SS1. Meanwhile, for convenience of explanation, it is illustrated and described that the lengths of the first and second long sides LS1 and LS2 are longer than the lengths of the first and second short sides SS1 and SS2, but a case in which the lengths of the first and second long sides LS1 and LS2 are approximately equal to the lengths of the first and second short sides SS1 and SS2 may be possible.

A direction parallel to the short sides SS1 and SS2 of the head 10 may be referred to as a first direction DR1 or an up-down direction. A direction parallel to the long sides LS1, LS2, and long Side of the head 10 may be referred to as a second direction DR2 or a left-right direction. A direction perpendicular to the long sides LS1 and LS2 and the short sides SS1 and SS2 of the head 10 may be referred to as a third direction DR3 or a front-rear direction.

A direction in which the head 10 displays an image may be referred to as a front (F, z), and a direction opposite to this may be referred to as a rear R. The side of the first short side SS1 may be referred to as a left side (Le, x). The side of the second short side SS2 may be referred to as a right side Ri. The side of the first long side LS1 may be referred to as an upper side (U, y). The side of the second long side LS2 may be referred to as a lower side D.

The first long side LS1, the second long side LS2, the first short side SS1, and the second short side SS2 may be referred to as an edge of the head 10. In addition, a point where the first long side LS1, the second long side LS2, the first short side SS1, and the second short side SS2 meet each other may be referred to as a corner.

A point where the first short side SS1 and the first long side LS1 meet may be a first corner C1. A point where the first short side SS1 and the second long side LS2 meet may be a second corner C2. A point where the second short side SS2 and the second long side LS2 meet may be a third corner C3. A point where the second short side SS2 and the first long side LS1 meet may be a fourth corner C4.

Figure 2:
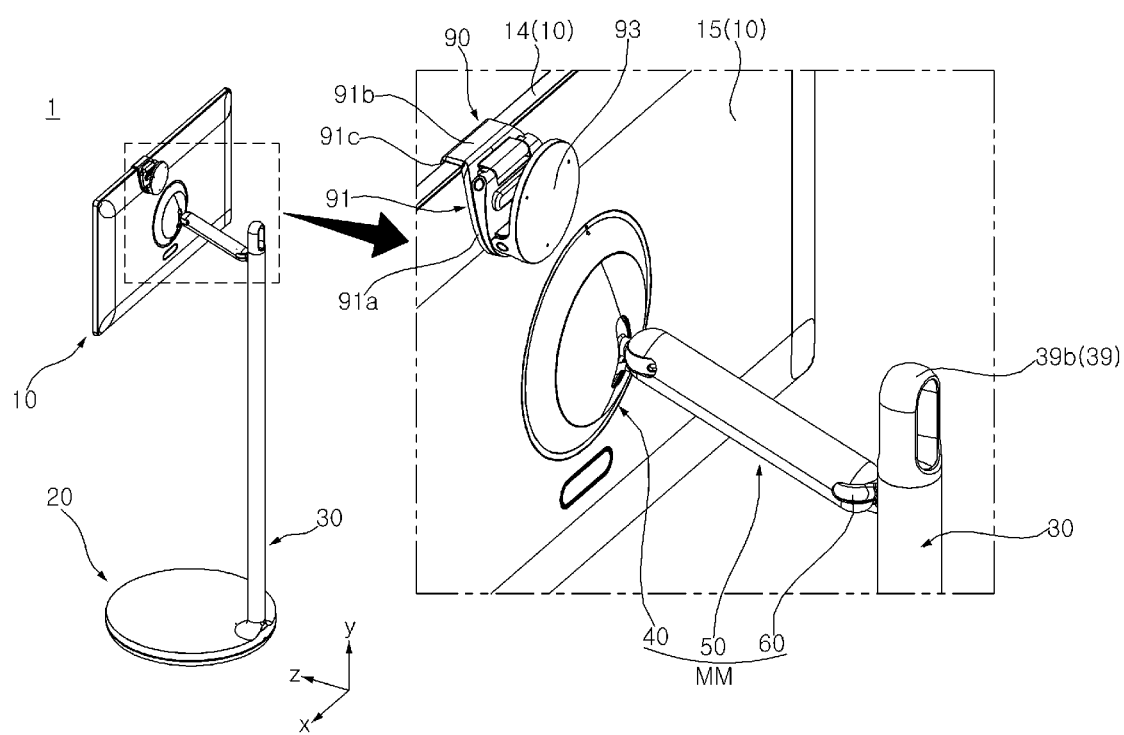

Referring to FIGS. 1 and 2, a display device 1 may include a base 20, a pole 30, and a motion module MM.

The base 20 may have a flat cylinder shape as a whole. The base 20 may be placed on a ground.

The pole 30 may extend long in a vertical direction. The lower end of the pole 30 may be coupled onto the base 20. The pole 30 may be adjacent to the circumference of the upper surface of the base 20. The handle 39 may be coupled to the upper end of the pole 30. The pole 30 and the aforementioned base 20 may be collectively referred to as a stand.

The motion module MM may extend in a direction intersecting the pole 30. One side of the motion module MM may be coupled to the rear side of the head 10. The other side of the motion module MM may be adjacent to the upper end of the pole 30 and may be coupled to the pole 30. An articulated connector 40 may be coupled to the rear side of the head 10, an elevating module 60 may be coupled to the pole 30, and an arm 50 may connect the articulated connector 40 and the elevating module 60.

Accordingly, the head 10 may be supported by the motion module MM, the pole 30, and the base 20, and may be spaced upward from a ground.

Figure 3:
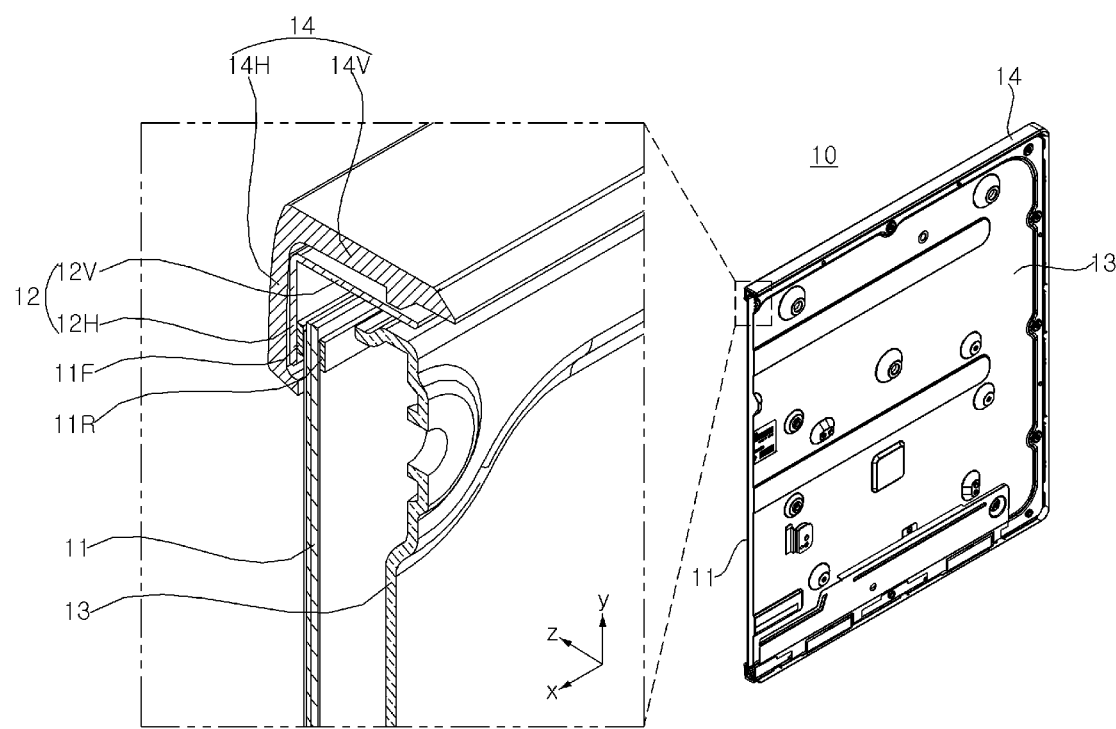

Referring to FIGS. 2 and 3, the head 10 may include a display panel 11, a middle cabinet 12, a frame 13, an end frame 14, and a back cover 15.

The display panel 11 may form the front surface of the head 10. For example, the display panel 11 may be an OLED panel, an LCD panel, or an LED panel. The display panel 11 may divide an image into a plurality of pixels and output the image by adjusting color, brightness, and saturation for each pixel. The display panel 11 may be divided into an active area in which an image is displayed and a de-active area in which an image is not displayed. The display panel 11 may generate light corresponding to red, green, or blue color according to a control signal.

The middle cabinet 12 may extend along the circumference of the display panel 11. A horizontal portion 12H may be located in front of the display panel 11. A vertical portion 12V may intersect the horizontal portion 12H and may cover the side surface of the display panel 11. For example, the middle cabinet 12 may include a metal or plastic material. The middle cabinet 12 may be referred to as a side frame or guide panel.

The frame 13 may be located in a rear of the display panel 11. Electronic components such as a printed circuit board (PCB) may be coupled to the rear surface of the frame 13. For example, the frame 13 may include a metal material. The frame 13 may be referred to as a mount plate or a module cover.

The end frame 14 may form a circumference of the head 10. The horizontal portion 14H may be located in front of the horizontal portion 12H of the middle cabinet 12. The vertical portion 14V may cover a side surface of the vertical portion 12V of the middle cabinet 12. For example, the end frame 14 may include a metal or plastic material.

The back cover 15 may form the rear surface of the head 10. The back cover 15 may cover the rear of the frame 13 and may be coupled to the frame 13.

Figure 4:
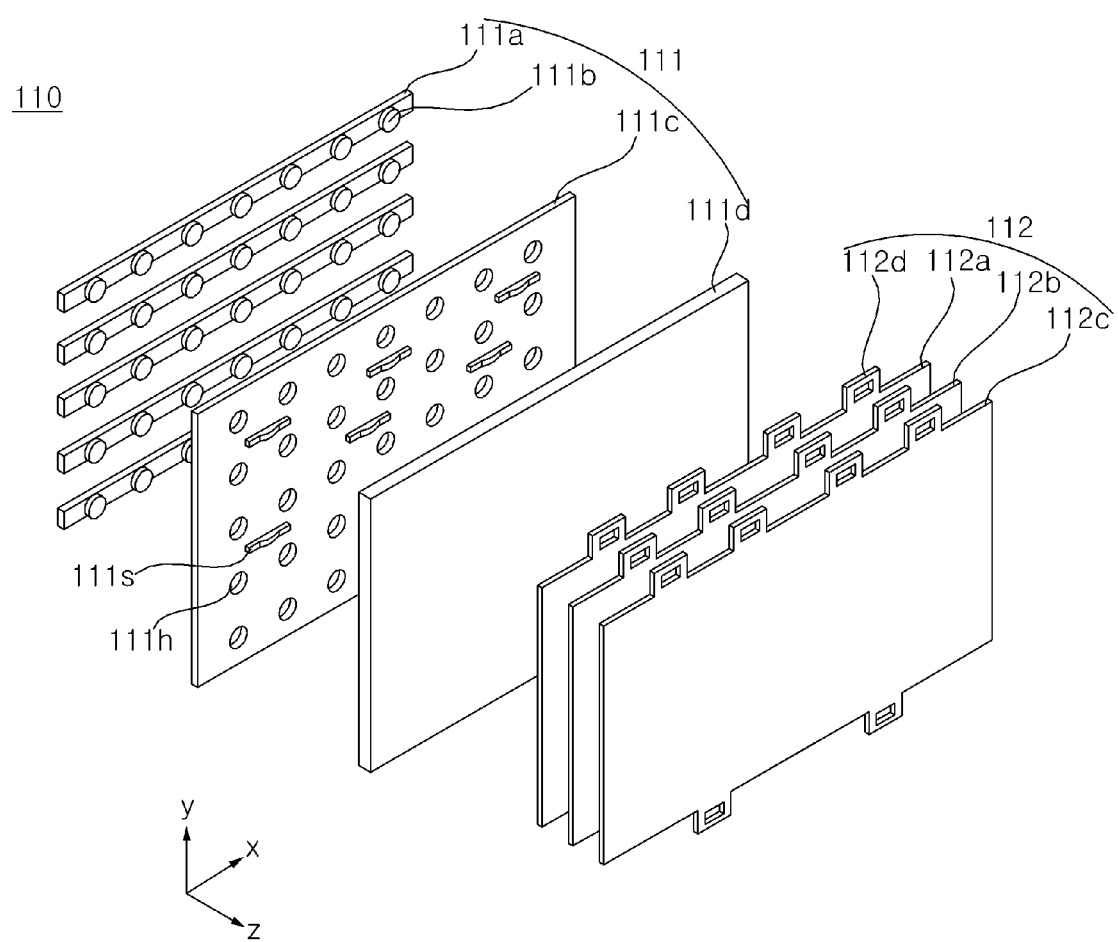

Referring to FIGS. 3 and 4, a backlight unit 110 may be located between the display panel 11 and the frame 13 and may be coupled to the frame 13. At this time, the display panel 11 may be referred to as an LCD panel. The backlight unit 110 may include an optical layer 111 and an optical sheet 112. The optical layer 111 may include a substrate 111a, at least one light source 111b, a reflective sheet 111c, and a diffusion plate 111d.

The substrate 111a may be coupled to the front surface of the frame 13. The substrate 111a may have a plate shape, or may be composed of a plurality of straps spaced apart from each other in a vertical direction. At least one light source 111b may be mounted on the substrate 111a. For example, the light source 111b may include alight emitting diode LED. An electrode pattern for connecting an adapter and the light source 111b may be formed on the substrate 111a. The reflective sheet 111c may be located in front of the substrate 111a. The reflective sheet 111c may have a hole 111h in which the light source 111b is located. The diffusion plate 111d may be located in front of the reflective sheet 111c. A spacer 111s may support the rear surface of the diffusion plate 111d at between the reflective sheet 111c and the diffusion plate 111d.

The optical sheet 112 may be located in front of the diffusion plate 111d. The rear surface of the optical sheet 112 may adhere to the diffusion plate 111d, and the front surface of the optical sheet 112 may adhere to or be adjacent to the rear surface of the display panel 110. The optical sheet 112 may include at least one of a diffusion sheet and a prism sheet. A coupling portion 112d may be formed on at least one edge of the optical sheet 112.

Accordingly, light from the light source 111b may be provided to the display panel 11 through the diffusion plate 111d and the optical sheet 112. Meanwhile, the display panel 11 of the present disclosure may be an OLED panel that does not require the above-described backlight unit 110 or other types of panels.

Figure 5:
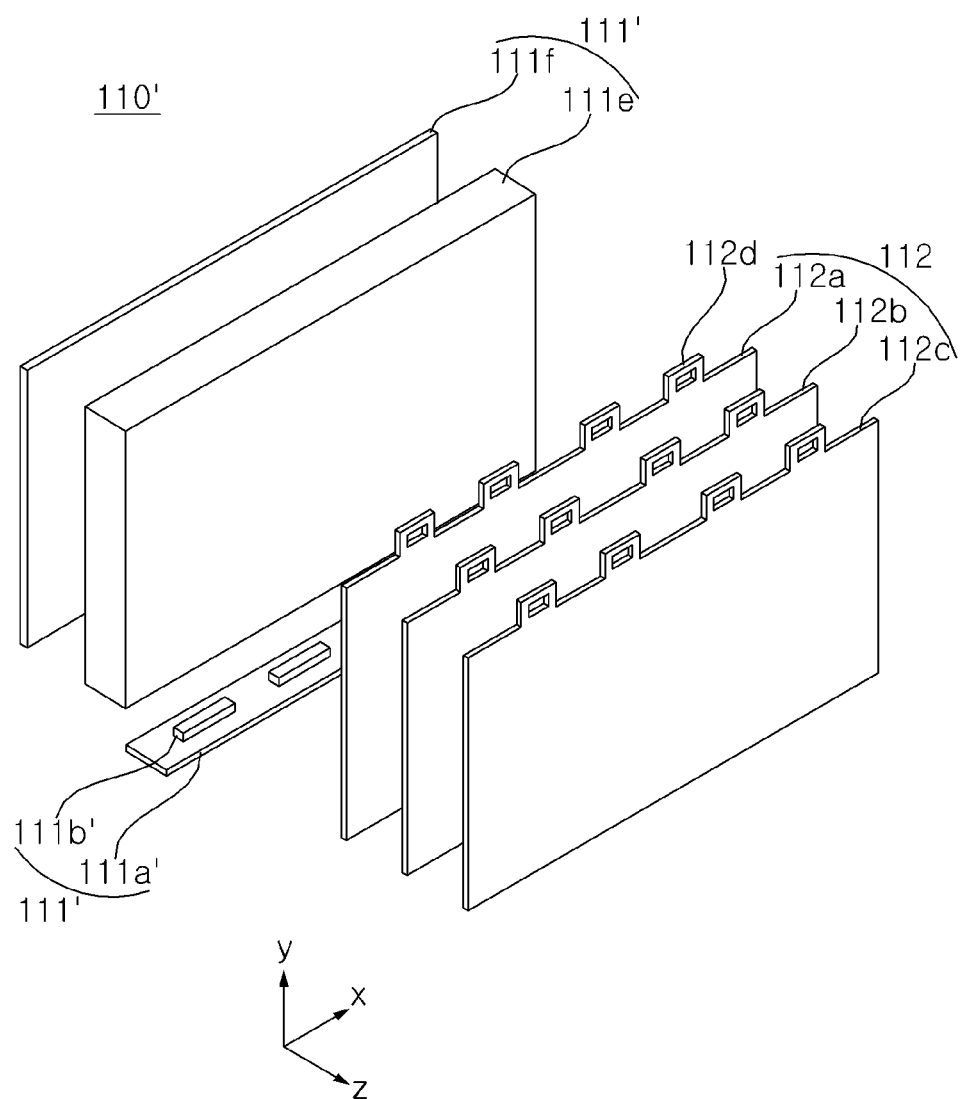

Referring to FIGS. 3 and 5, the backlight unit 110' may be located between the display panel 11 and the frame 13, and coupled to the frame 13. At this time, the display panel 11 may be referred to as an LCD panel. The backlight unit 110' may include an optical layer 111' and an optical sheet 112. The optical layer 111' may include a substrate 111a', at least one light source 111b', a reflective sheet 111f, and a light guide plate 111e. The light guide plate 38 may be located between the frame 13 and the optical sheet 112, and may be supported by the frame 13.

The substrate 111a' may be adjacent to the circumference of the light guide plate 38 and may be coupled to the frame 13. At least one light source 111b' may be mounted on the substrate 111a'. For example, the light source 111b' may include alight emitting diode LED. An electrode pattern for connecting the adapter and the light source 111b' may be formed on the substrate 111a'. The reflective sheet 111f may be located between the frame 13 and the light guide plate 111e, and may be supported by the frame 13.

Accordingly, the light from the light source 111b' may be provided to the display panel 11 through the light guide plate 111e and the optical sheet 112.

Meanwhile, the display panel 11 of the present disclosure may be an OLED panel that does not require the above-described backlight unit 110' or other types of panel.

Figure 6:
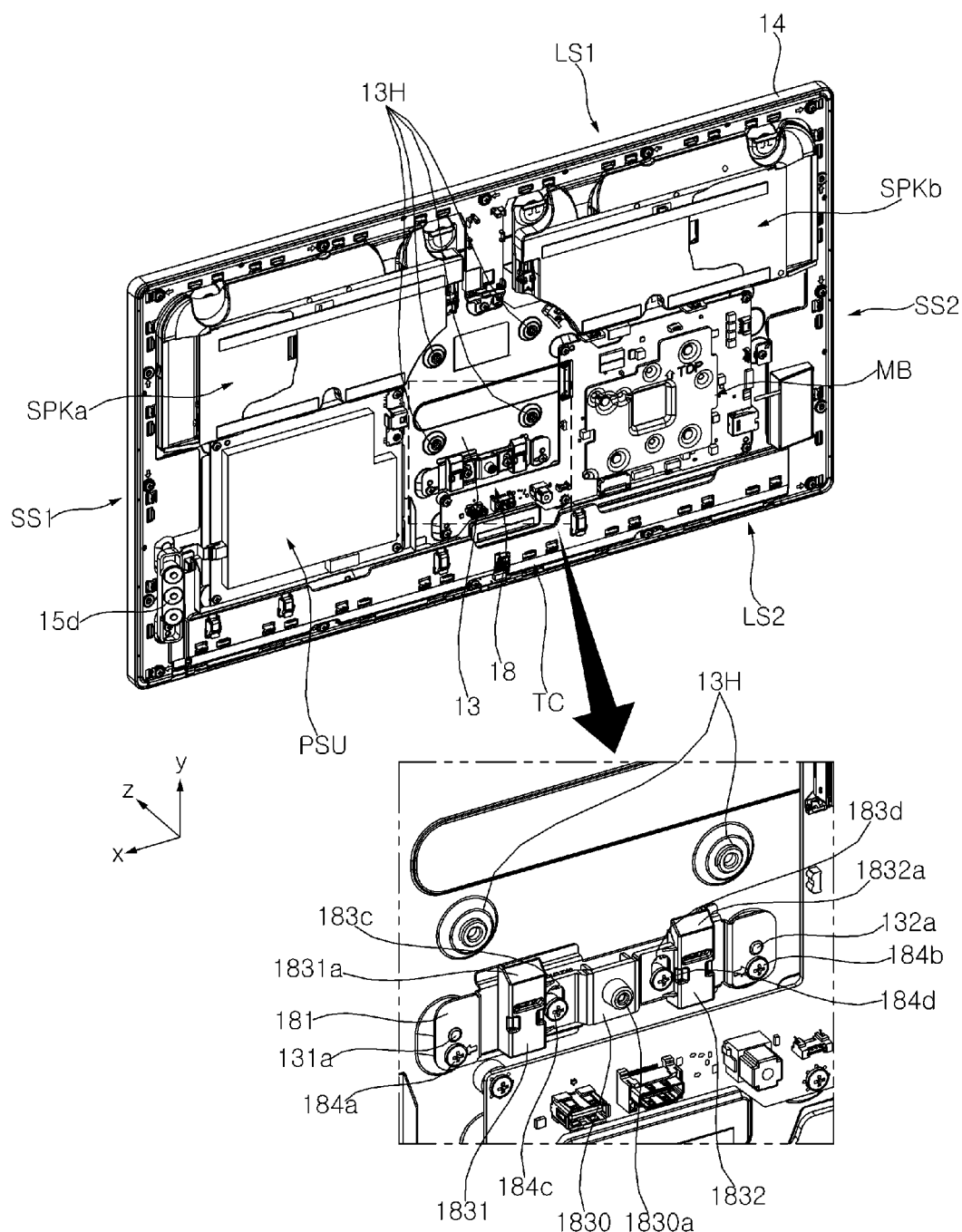

Referring to FIG. 6, electronic components may be mounted on the rear surface of the frame 13, and may include a plurality of boards (PSU, MB, TC) and speakers (SPKa, SPKb).

A power supply board (PSU) may be located closer to the first short side SS1 than the second short side SS2, and may be coupled to the rear surface of the frame 13. The power supply board (PSU) may provide power to each component of the display device. For example, the power supply board (PSU) may provide power to the light source 111b, 111b of the backlight unit 110, 110' (see FIGS. 4 and 5). The power supply board (PSU) may be referred to as an LED driver.

A main board (MB) may be located closer to the second short side SS2 than the first short side SS1 and may be coupled to the rear surface of the frame 13. The main board MB may control the display device.

A timing controller board (TC) may be located below the power supply board (PSU) and the main board (MB), and may be coupled to the rear surface of the frame 13. The timing controller board TC may be electrically connected to the display panel 11 (see FIG. 3) through a cable (not shown), and may provide an image signal to the display panel 11.

Speakers (SPKa, SPKb) may be located on a plurality of boards (PSU, MB, TC), may be coupled to the rear surface of the frame 13. For example, a left speaker SPKa may be located closer to the first short side SS1 than the second short side SS2, and may provide sound in a lateral direction. For example, a right speaker SPKb may be located closer to the second short side SS2 than the first short side SS1, and may provide sound in a lateral direction.

A locking unit 18 may be coupled to the rear surface of the frame 13. The locking unit 18 may be located below a central portion of the frame 13. The locking unit 18 may be referred to as an auto click unit.

Figure 7:
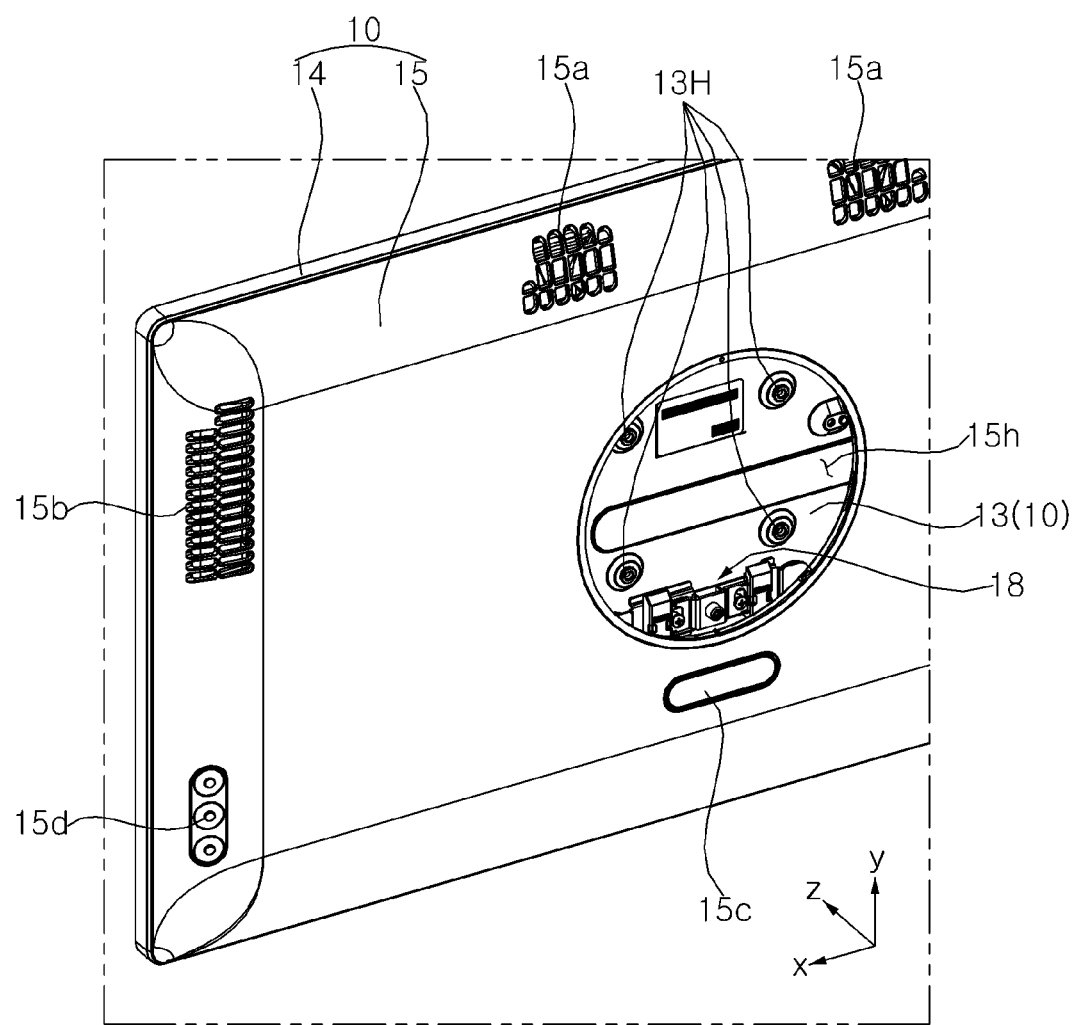

Referring to FIG. 7, the back cover 15 may cover the rear of the frame 13 and may be coupled to the frame 13. The location of the speaker hole 15a, 15b formed in the back cover 15 may correspond to the location of speaker SPKa, SPKb (see FIG. 8) mounted in the frame 13. The cover 15c may be detachably coupled to the back cover 15, and may cover an input unit (see FIG. 6) located below the locking unit 18. The input unit may be connected to HDMI or USB.

For example, a jersey 150 (see FIG. 21) may cover the rear surface of the back cover 15 and may include a fabric material.

A fixing portion 13H may protrude in a rearward direction from the rear surface of the frame 13. The fixing portion 13H may be a pem nut. The fixing portion 13H and the locking unit 18 may be exposed to the outside through a hole 15h formed in the center of the back cover 15.

Figure 8:
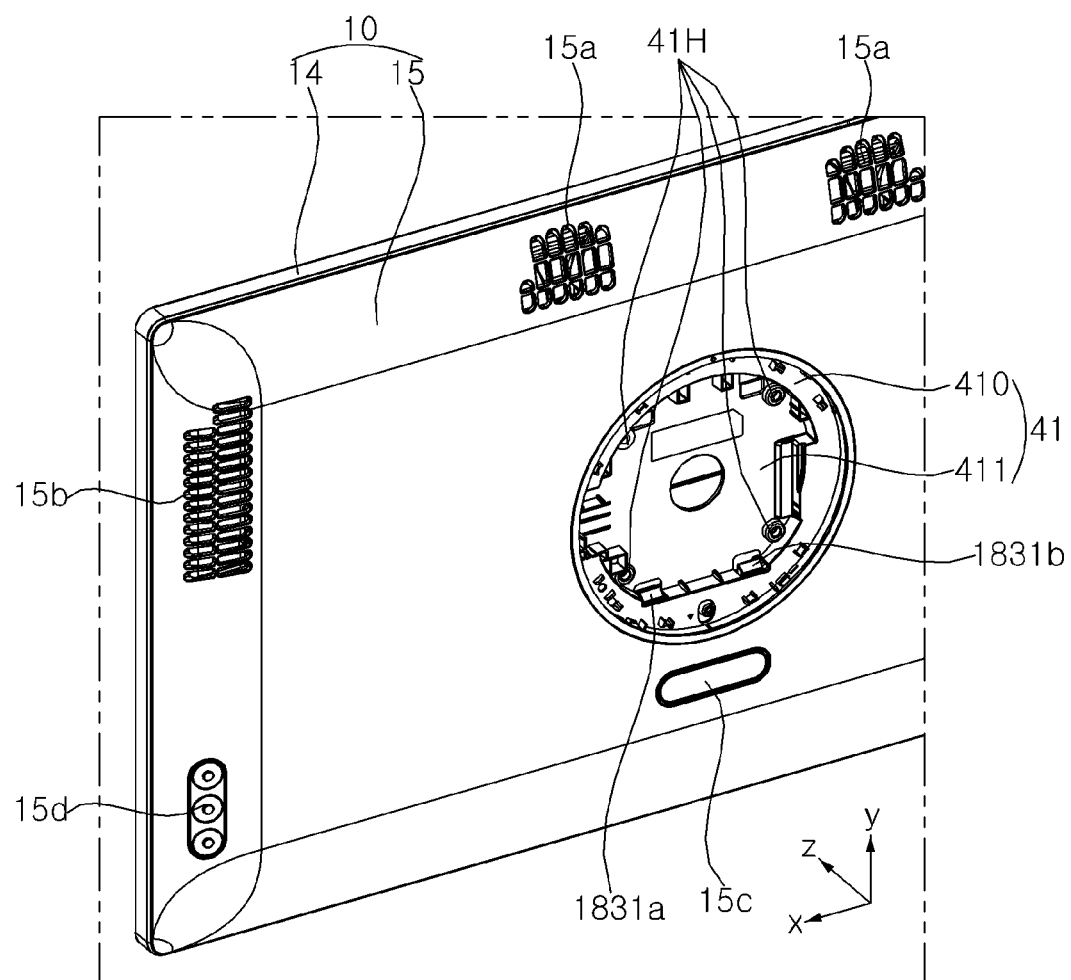
Figure 9:
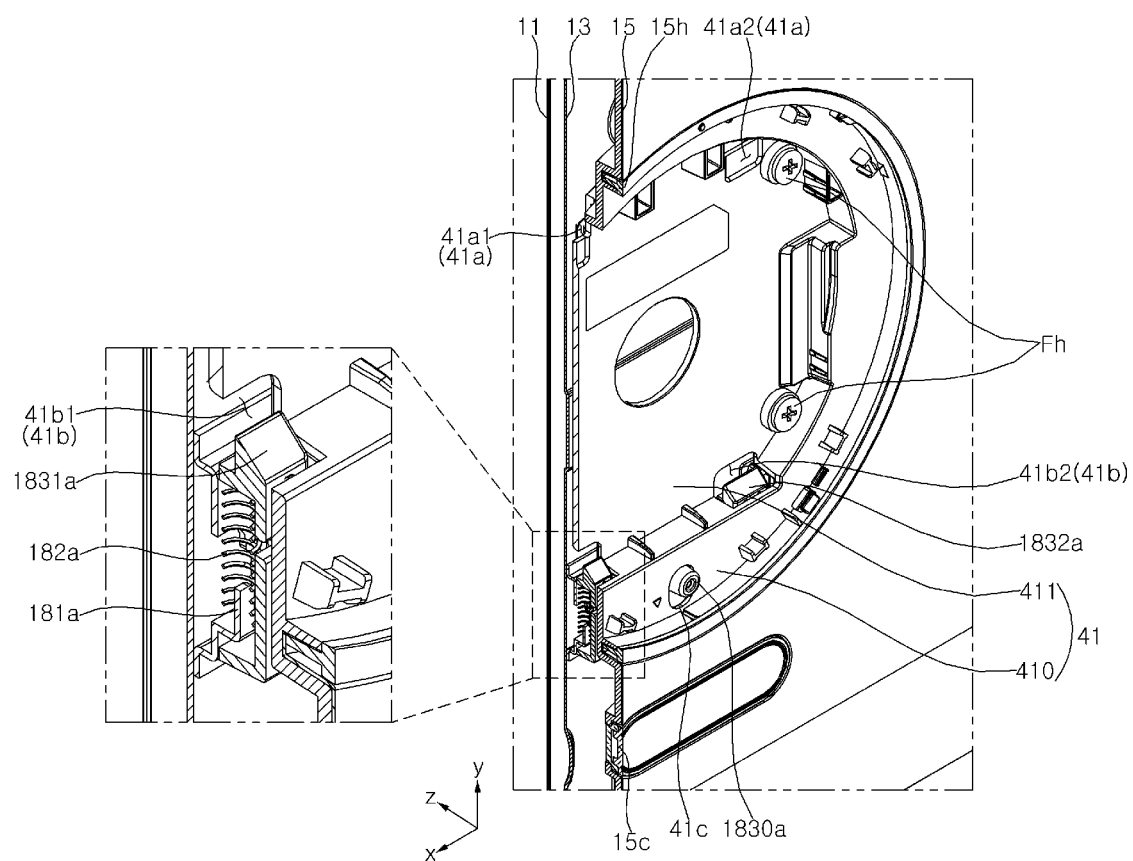

Referring to FIGS. 8 and 9, a fixing plate 41 may have a circular plate shape corresponding to the hole 15h of the back cover 15. The fixing plate 41 may be located in the hole 15h. The fixing plate 41 may include a first recessed portion 410 and a second recessed portion 411. The first recessed portion 410 may be formed while being recessed in a forward direction in the fixing plate 41, and may extend along the circumference of the fixing plate 41. The second recessed portion 411 may be formed while being recessed in a forward direction from the first recessed portion 410, and may form a central portion of the fixing plate 41.

A fixing hole 41H may be formed in the second recessed portion 411 of the fixing plate 41, and may be aligned with the fixing portion 13H (see FIG. 7). A fastening member Fh, such as a screw, may be fastened to the fixing portion 13H (see FIG. 7) through the fixing hole 41H. Accordingly, the fixing plate 41 may be coupled to the frame 13 (see FIG. 7).

A bottom hole 41b may be formed to penetrate the second recessed portion 411, and may be located below the center of the fixing plate 41. The bottom hole 41b may be formed in a lower portion of the second recessed portion 411, and may be located at a boundary between the second recessed portion 411 and the first recessed portion 410. The location of the bottom hole 41b may correspond to the location of a hooking portion 1831a, 1832a of the locking unit 18 (see FIG. 7). A first hooking portion 1831a may penetrate a first bottom hole 41b1, and a gap may be formed between the rear surface of the second recessed portion 411 and the front surface of the first hooking portion 1831a. A second hooking portion 1832a may penetrate a second bottom hole 41b2, and a gap may be formed between the rear surface of the second recessed portion 411 and the front surface of the second hooking portion 1832a.

A top hole 41a may be formed to penetrate the second recessed portion 411, and may be located above the center of the fixing plate 41. The top hole 41a may be formed above the second recessed portion 411, and may be located at a boundary between the second recessed portion 411 and the first recessed portion 410. In the vertical direction, each of a first top hole 41a1 and a second top hole 41a2 may be aligned with each of the first bottom hole 41b1 and the second bottom hole 41b2.

Figure 10:
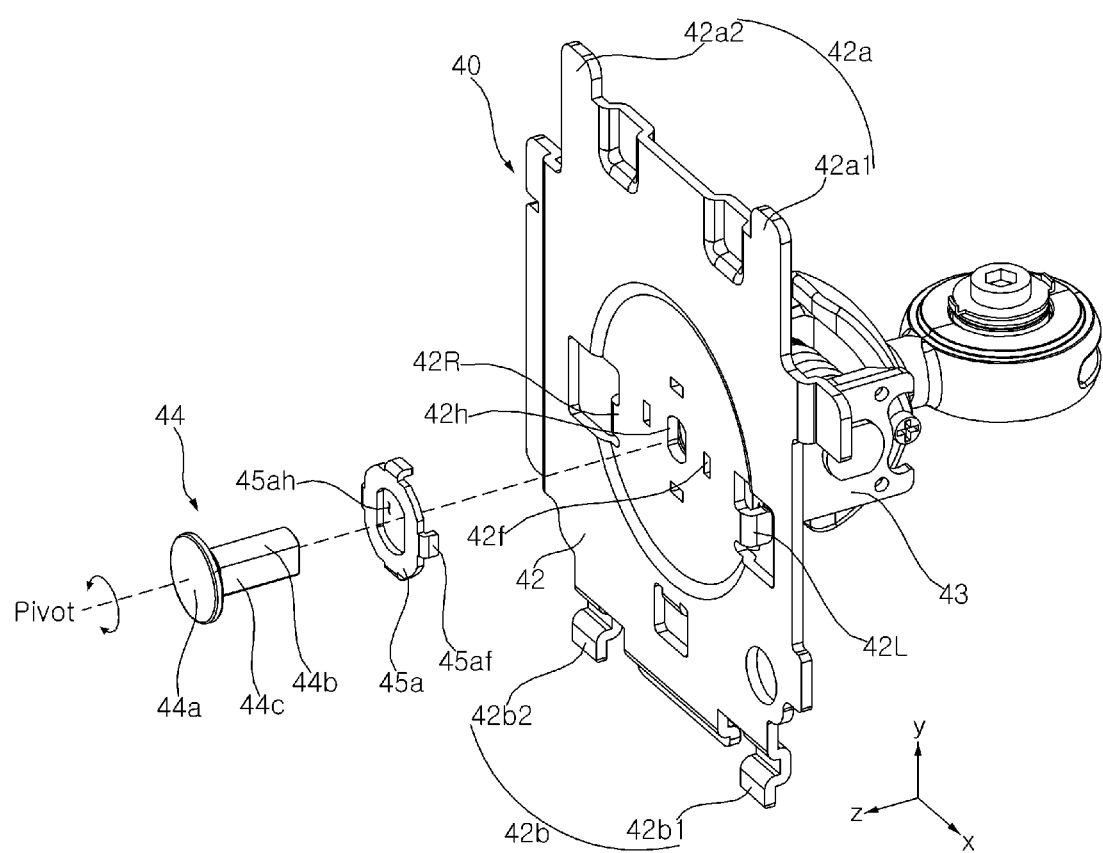

Referring to FIG. 10, a front bracket 42 of the articulated connector 40 may have a plate shape as a whole.

A pivot shaft 44 may extend in a front-rear direction. The diameter of a head 44a of the pivot shaft 44 may be greater than the diameter of a body 44b. A pair of cut-outs 44c may be formed in the side surface of the body 44b, and may face each other. A hole 42h of the front bracket 42 may be formed in the central portion of the front bracket 42 and may be penetrated by the body 44b. The shape of the hole 42h of the front bracket 42 may be the same as the shape of the longitudinal section of the body 44b. Accordingly, the pivot shaft 44 and the front bracket 42 may rotate together with respect to the axial direction of the pivot shaft 44. That is, the pivot shaft 44 may provide a pivot axis.

A front grab 45a may be located between the head 44a and the front surface of the front bracket 42. A hole 45ah of the front grab 45a may be aligned with the hole 42h of the front bracket 42, and may have the same shape as the hole 42h. The body 44b may penetrate the holes 45ah and 42h. The front grab 45a may be fixed to the front bracket 42. That is, the front grab 45a may rotate together with the pivot shaft 44 and the front bracket 42.

Figure 11:
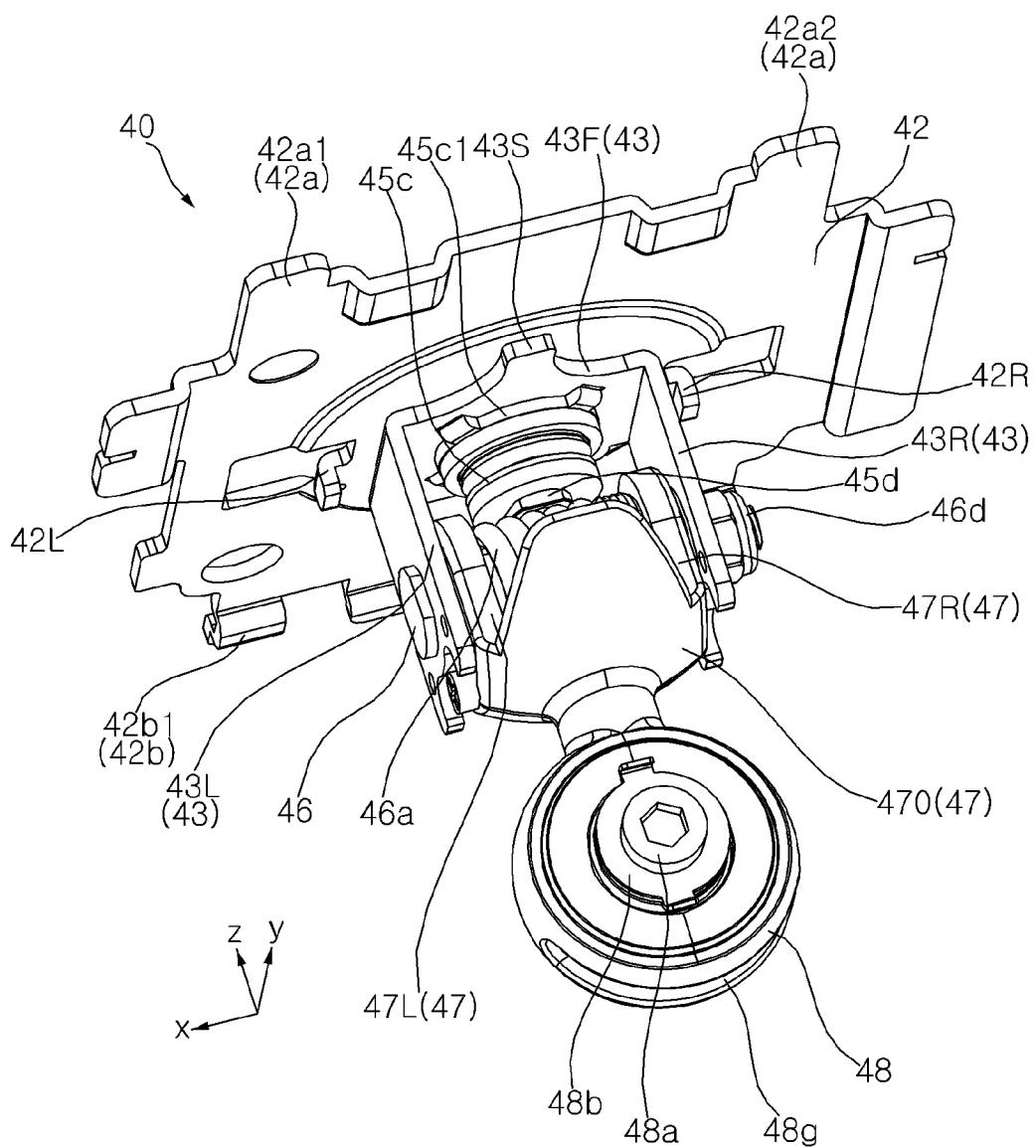
Figure 12:
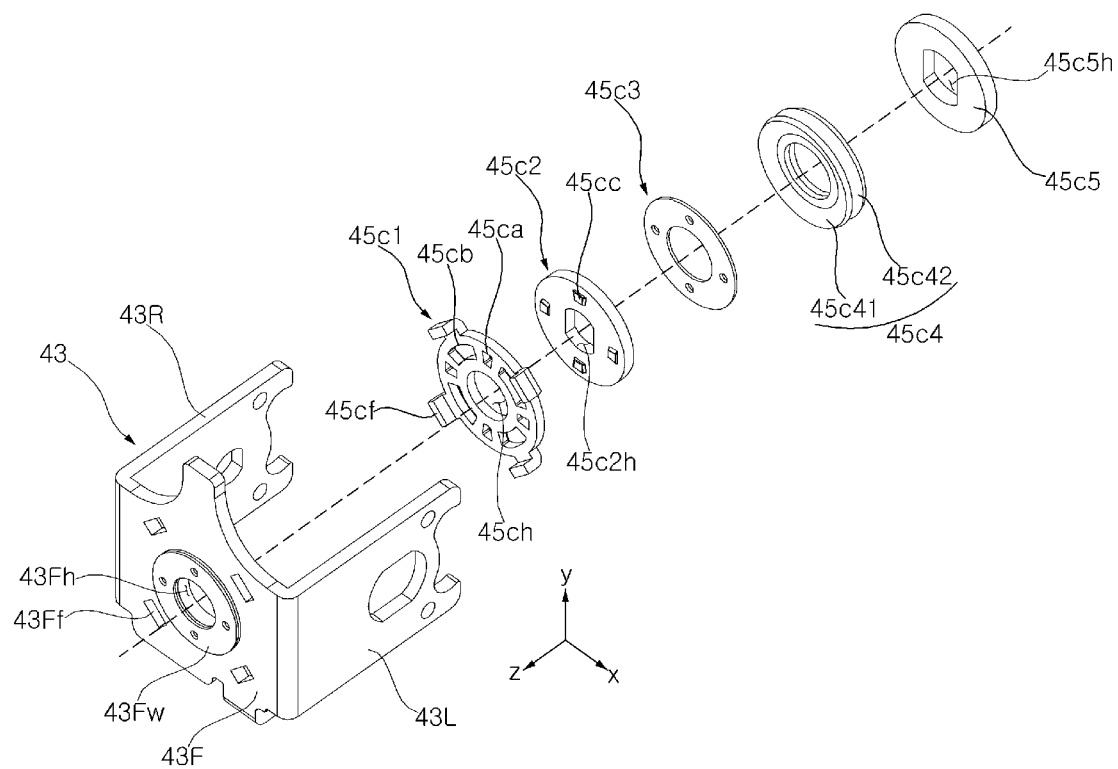

Referring to FIGS. 11 and 12, a rear bracket 43 may be located in a rear of the front bracket 42. The rear bracket 43 may include a mount 43F, a left wing 43L, and a right wing 43R.

The mount 43F may face the front bracket 42, and may have a circular mount hole 43Fh. At least one washer 43Fw may be located between the front bracket 42 and the mount 43F, and may have a circular hole. The body 44b of the pivot shaft 44 may penetrate the hole of the washer 43Fw and the mount hole 43Fh, and may rotate independently of the washer 43Fw and the mount 43F.

The left wing 43L may extend in a rearward direction from the left side of the mount 43F. The right wing 43R may extend in a rearward direction from the right side of the mount 43F. A plurality of members 45c (45c1, 45c2, 45c3, 45c4, 45c5) described later may be coupled to the mount 43F at between the left wing 43L and the right wing 43R.

A rear grab 45c1 may face the washer 43Fw with respect to the mount 43F, and may have a circular hole 45ch through which the body 44b of the pivot shaft 44 passes. The rear grab 45c1 may be fixed to the rear surface of the mount 43F.

In addition, a plurality of fixing holes 45ca and a plurality of slots 45cb may be formed in the rear grab 45c1, and may be spaced apart from each other in the circumferential direction of the rear grab 45c1. The plurality of fixing holes 45ca and the plurality of slots 45cb may be alternately located in the circumferential direction of the rear grab 45c1. For example, the fixing holes 45ca or the slots 45cb may be spaced apart from each other at intervals of 90 degrees. In the circumferential direction of the rear grab 45c1, the length of the slot 45cb may be greater than the length of the fixing hole 45ca.

A disk 45c2 may be located in the rear of the rear grab 45c1, and may have a hole 45c2h through which the body 44b passes and which has the same shape as the longitudinal section of the body 44b. A plurality of bosses 45cc may protrude from the front surface of the disk 45c2 toward the rear grab 45c1, and may be spaced apart from each other in the circumferential direction of the disk 45c2. For example, the bosses 45cc may be spaced apart from each other at intervals of 90 degrees. The size of the boss 45cc may be the same as or correspond to the size of the fixing hole 45ca. That is, when the boss 45cc is inserted into the fixing hole 45ca, rotations of the disk 45c2 and the pivot shaft 44 may be restricted to a certain level by the rear grab 45c1. Further, when the boss 45cc is inserted into the slot 45cb, the disk 45c2 and the pivot shaft 44 may rotate within the trajectory of the slot 45cb.

The washer 45c3 may be located in a rear of the disk 45c2, and may have a circular hole (no reference numeral) through which the body 44b of the pivot shaft 44 passes.

A disc spring 45c4 may face the disc 45c2 with respect to the washer 45c3, and may have a circular hole (unsigned) through which the body 44b of the pivot shaft 44 passes. The disc spring 45c4 may have elasticity and may be convex forward or rearward. The disc spring 45c4 may generate an elastic force in the axial direction of the pivot shaft 44.

A cap 45c5 may be located in a rear of the disc spring 45c4, and may have a hole 45c5h through which the body 44b of the pivot shaft 44 passes. The shape of the hole 45c5h may be the same as the shape of the longitudinal section of the body 44b. The cap 45c5 may be fixed to a distal end of the body 44b.

Accordingly, the pivot shaft 44 may rotate together with the front bracket 42, the front grab 45a, the disk 45c2, and the cap 45c5. In addition, the pivot shaft 45 may rotate independently of the washer 43Fw, the rear bracket 43, the rear grab 45c1, the washer 45c3, and the disc spring 45c4. In other words, even if the pivot shaft 45 rotates, the washer 43Fw, the rear bracket 43, the rear grab 45c1, the washer 45c3, and the disc spring 45c4 may not rotate.

In addition, a user may pivot the head 10 (see FIGS. 8 and 9) fixed to the front bracket 42 with respect to the pivot shaft 44. For example, the head 10 may be pivoted within a range of +90 degrees to −90 degrees. In addition, due to the elastic force of the aforementioned disk spring 45c41, 45c2, the head 10 may maintain a certain pivot angle unless an external force of a certain level or higher is applied. In addition, during the pivoting movement of the head 10, a user may feel a sense of fastening according to the fastening of the boss 45cc and the fixing hole 45ca or the slot 45cb. That is, when the boss 45cc comes out of the slot 45cb and is inserted into the fixing hole 45ca, a user may feel that the head 10 is located at a pivot angle of 0 degree, +90 degree, or −90 degree.

Figure 13:
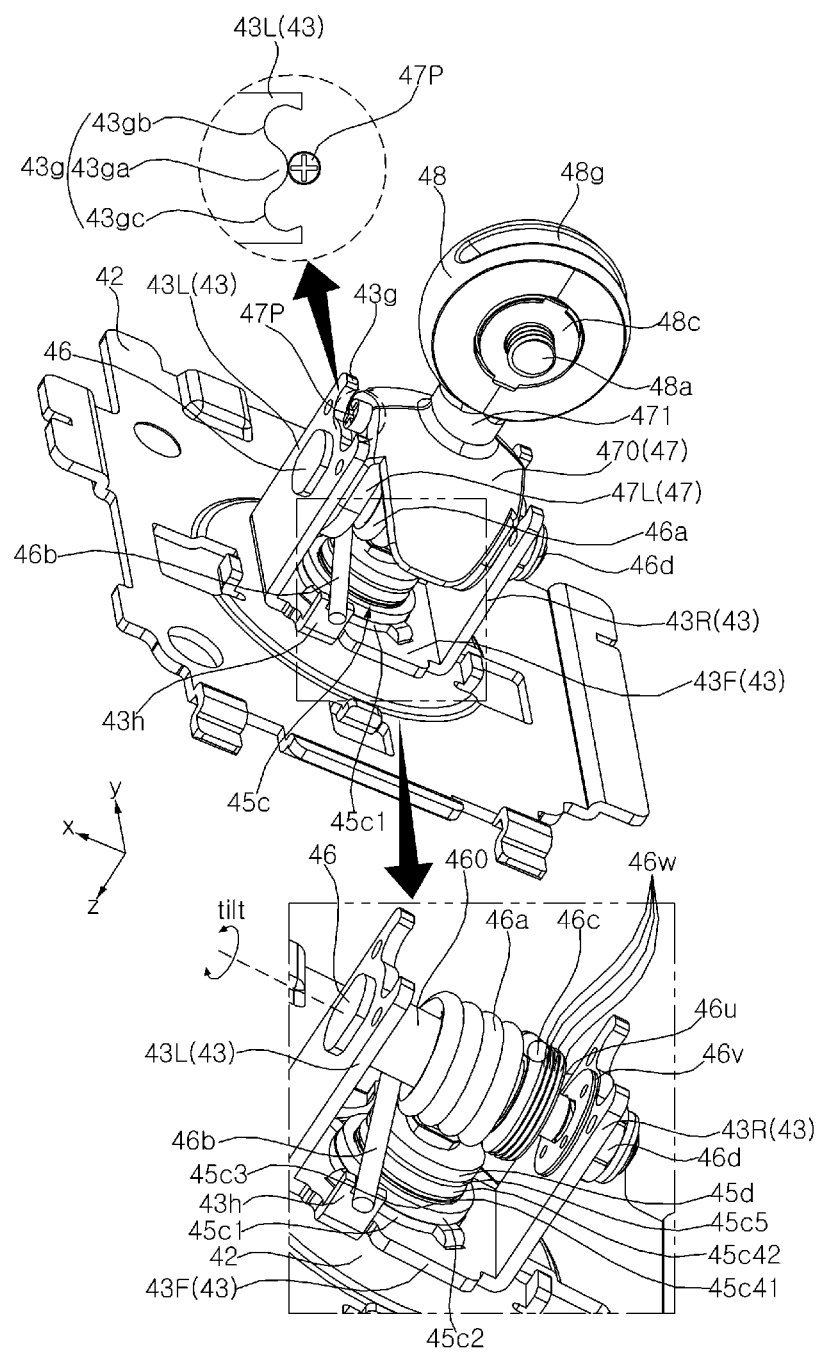

Referring to FIG. 13, a holder 47 may be located between the left wing 43L and the right wing 43R. A holder body 470 may cover the rear of the mount 43F of the rear bracket 43. The first part 47L may protrude toward the mount 43F from the left side portion of the holder body 470 and may be adjacent to the left wing 43L. A second part 47R (see FIG. 11) may protrude toward the mount 43F from the right side portion of the holder 47 and may be adjacent to the right wing 43R.

A tilt shaft 46 may extend in the left-right direction. The tilt shaft 46 may penetrate the left wing 43L, the first part 47L, the second part 47R, and the right wing 43R. A head (no reference numeral), which is one end of the tilt shaft 46, may be seated on the side surface of the left wing 43L. The other end of the tilt shaft 46 may be threaded, and a fastening member 46d such as a nut may be fastened to the other end of the tilt shaft 46 on the right wing 43R.

In addition, the tilt shaft 46 may have a cylindrical shape as a whole, and may be fixed to the left wing 43L and the right wing 43R. The tilt shaft 46 may be rotatably coupled to the holder 47. That is, the tilt shaft 46 may provide a tilt axis. At least one washer 46v may be located between the second part 47R and the right wing 43R, and may have a circular hole through which the tilt shaft 46 passes.

An elastic member 46a may be located between the left wing 43L and the right wing 43R. The elastic member 46a may be wound around the outer circumference of the tilt shaft 46 multiple times, and may have elasticity. The elastic member 46a may be a coil-shaped spring.

In addition, a part 46b of the elastic member 46a may extend in a direction intersecting the tilt shaft 46 without being wound around the tilt shaft 46. The part 46b of the elastic member 46a may be hooked on a mounting portion 43h protruding in a rearward direction from the mount 43F.

In addition, one end of the elastic member 46a may be formed in the part 46b, and the other end of the elastic member 46b may be fixed to the inner side the holder 47. The disc spring 46w may be adjacent to the other end 46c of the elastic member 46a, and may be located between the elastic member 46a and the second part 47R. The disc spring 46w may have a circular hole (no reference numeral) through which the tilt shaft 46 passes. The disc spring 46w may be convex in a direction toward the elastic member 46*a*, and may generate an elastic force in an axial direction of the tilt shaft 46.

Accordingly, the tilt shaft 46 may rotate together with the rear bracket 43, the front bracket 42, and the plurality of members 45*c*5, 45*c*4, 45*c*3, 45*c*2, 45*c*1, 43Fw, 45*a*, and 44. In response to the rotation of the tilt shaft 46, the head 10 (see FIGS. 8 and 9) fixed to the front bracket 42 may be tilted up or down. For example, the head 10 may be tilted within a range of +25 degrees to −25 degrees. In addition, due to the elastic force of the elastic member 46*a* and the disk spring 46*w*, the head 10 may maintain a certain tilt angle unless an external force of a certain level or higher is applied.

Figure 14:
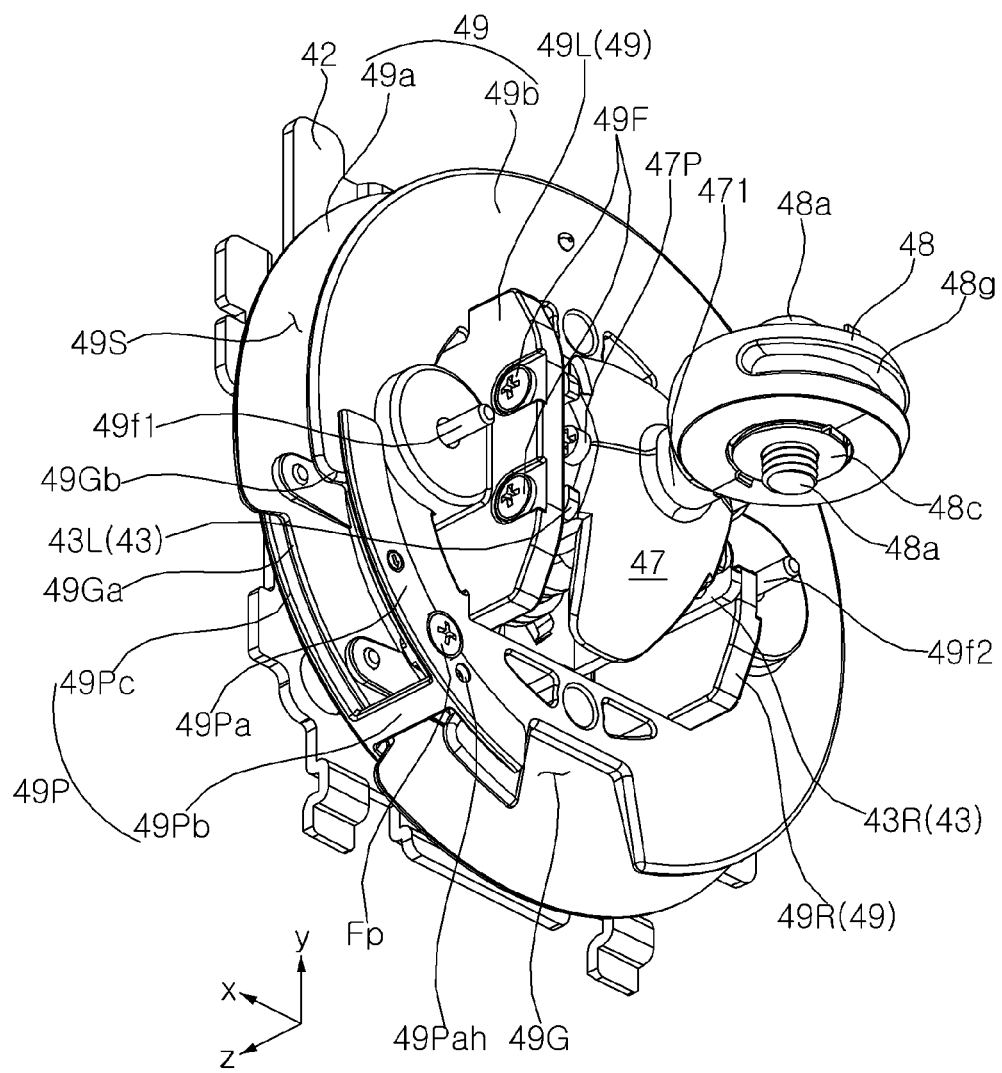
Figure 15:
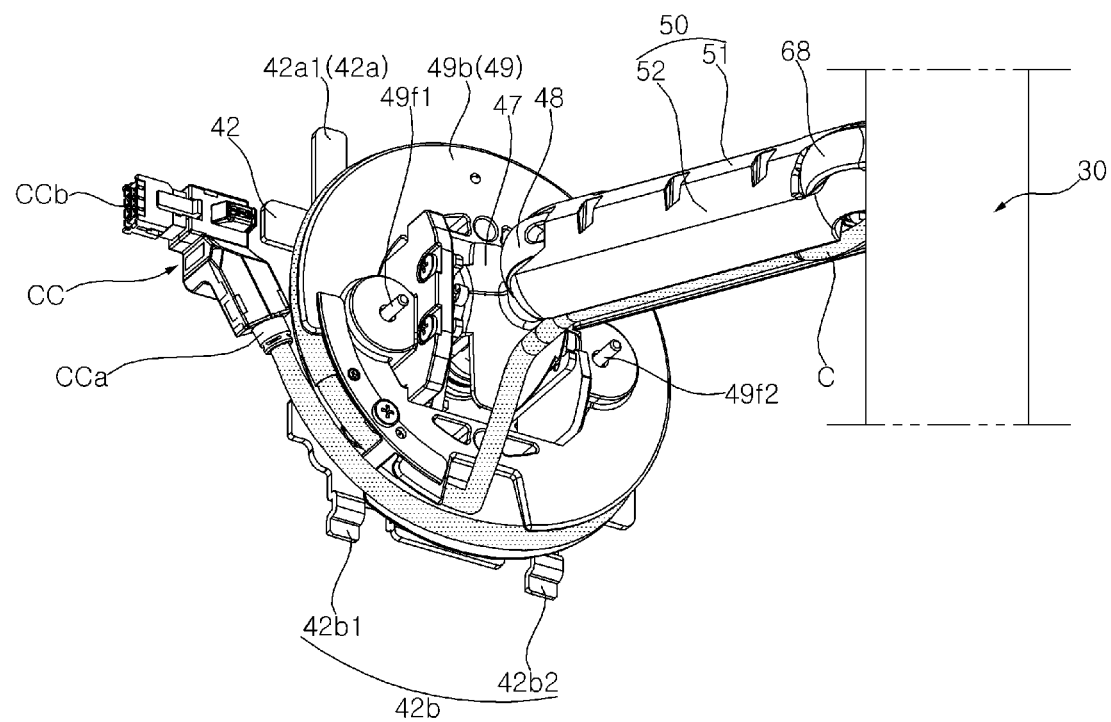

Referring to FIGS. 14 and 15, a first rotation unit 48 may be located in a rear of the holder 47. A first connection portion 471 may connect the holder 47 and the first rotation unit 48. For example, the holder 47, the first connection portion 471, and the first rotation unit 48 may be formed as one body.

A cable reel 49 may be located in a rear of the front bracket 42. The cable reel 49 may be coupled to the left wing 43L and the right wing 43R through the fastening member 49F such as a screw.

The rear bracket 43 and the holder 47 may be located in an inner space of a reel body (not shown) having a hollow cylinder shape of the cable reel 49. Each of the first plate 49*a* and the second plate 49*b* of the cable reel 49 may protrude in the radial direction of the reel body from each of the front and rear ends of the reel body, and extend along the outer circumference of the reel body. That is, each of the first plate 49*a* and the second plate 49*b* may have a ring shape as a whole. Accordingly, the cable C may be wound around the reel body of the cable reel 49 at between the first plate 49*a* and the second plate 49*b*.

Figure 16:
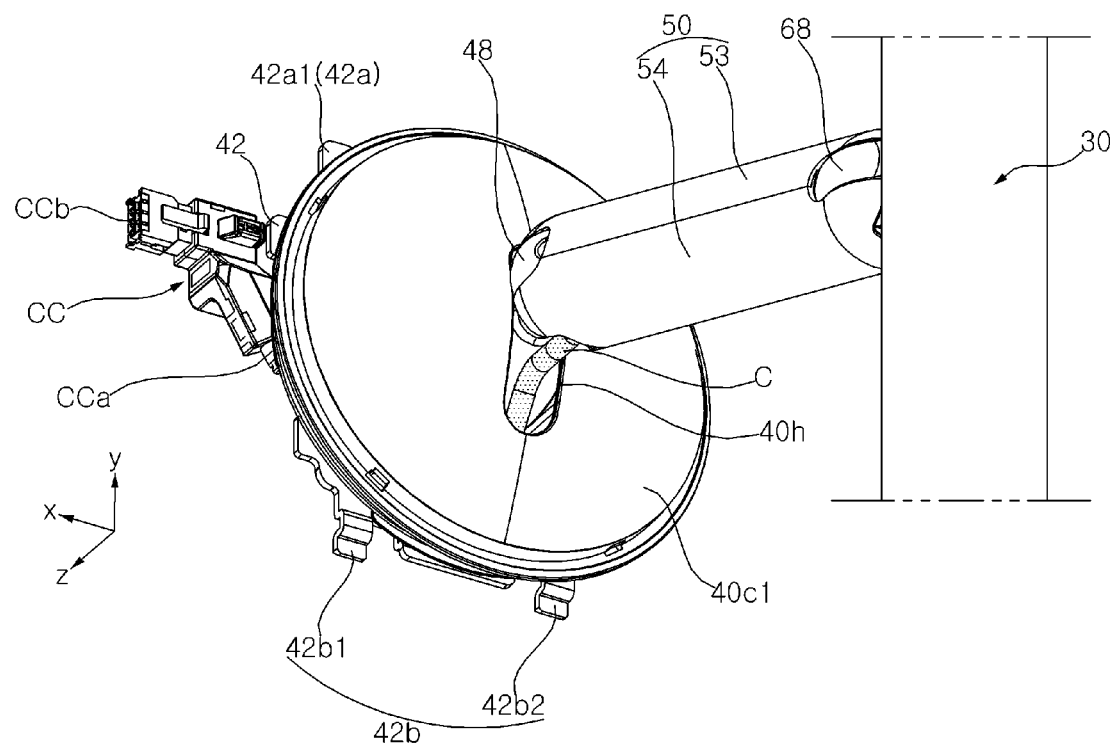
Figure 17:
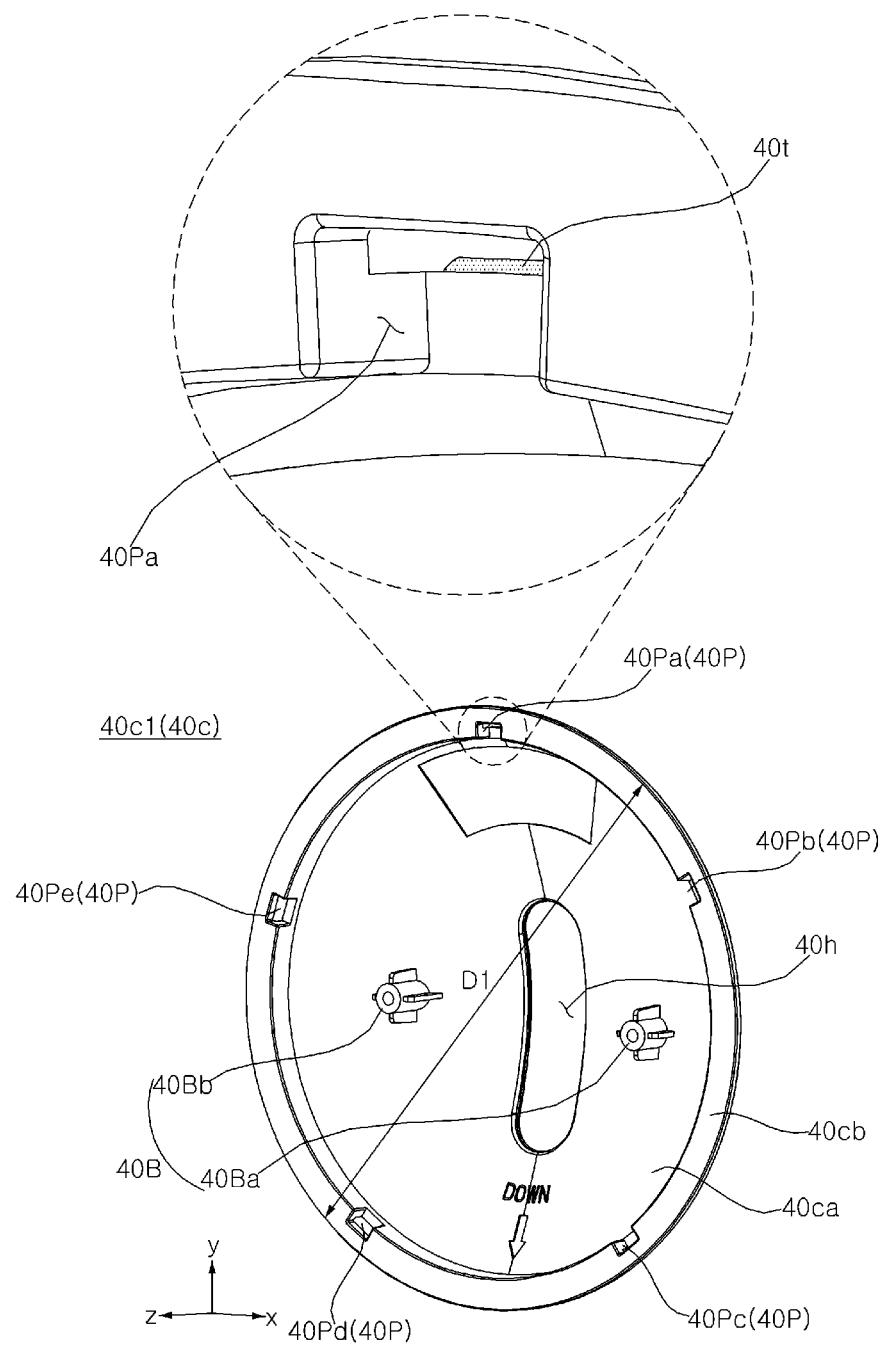

Referring to FIGS. 16 and 17, an inner cover 40*c*1 of a cover 40*c* may have a disk shape as a whole. For example, the inner cover 40*c*1 may include a plastic material. The inner cover 40*c*1 may include a dome 40*ca* and a rim 40*cb*.

The dome 40*ca* may be convex in a rearward direction. A cover hole 40*h* may be formed in the dome 40*ca* and may have a longitudinally long slot shape. The first rotation unit 48 may penetrate the cover hole 40*h*. A cable C may penetrate the cover hole 40*h*.

The rim 40*cb* may protrude from the outer circumference of the dome 40*ca* in the radial direction of the dome 40*ca*, and may extend along the outer circumference of the dome 40*ca*. The rim 40*cb* may define the outer diameter D1 of the inner cover 40*c*1. The rim 40*cb* may be referred to as a horizontal rim.

An insertion groove 40P may be formed in the inner circumference of the rim 40*cb*, and a part of the insertion groove 40P may be formed to penetrate the outer circumference of the dome 40*ca*. Here, the outer circumference of the dome 40*ca* may have a band shape of a certain width (see FIG. 20). A plurality of insertion grooves 40P*a*, 40P*b*, 40P*c*, 40P*d*, and 40P*e* may be spaced apart from each other along the circumferential direction of the rim 40*cb*. The insertion groove 40P may be referred to as a seating groove.

An inner coupling projection 40*t* may protrude outward from the outer circumference of the dome 40*ca*, and may be spaced in a rearward direction from the rim 40*cb*. The inner coupling projection 40*t* may be adjacent to the insertion groove 40P. Each of the plurality of inner coupling projections 40*t* may correspond to each of the plurality of insertion grooves 40P*a*, 40P*b*, 40P*c*, 40P*d*, and 40P*e*. The inner coupling projection 40*t* may be referred to as an inner latch projection.

The cover coupling portion 40B may protrude from the inner surface of the dome 40*ca* toward the cable reel 49 (see FIG. 15). A female thread may be formed on the inner side of the cover coupling portion 40B. For example, the cover coupling portion 40B may include a first cover coupling portion 40B*a* and a second cover coupling portion 40B*b* that face each other with respect to the cover hole 40*h*.

A fastening member 49*f*1, 49*f*2 (see FIG. 15) may penetrate the cable reel 49 to protrude in a rearward direction, and may be coupled to the inner side of the cover coupling portion 40B. For example, the fastening member 49*f*1, 49*f*2 may be a screw or a bolt.

Accordingly, the inner cover 40*cl* may be coupled to the cable reel 49 and cover the rear of the cable reel 49.

Figure 18:
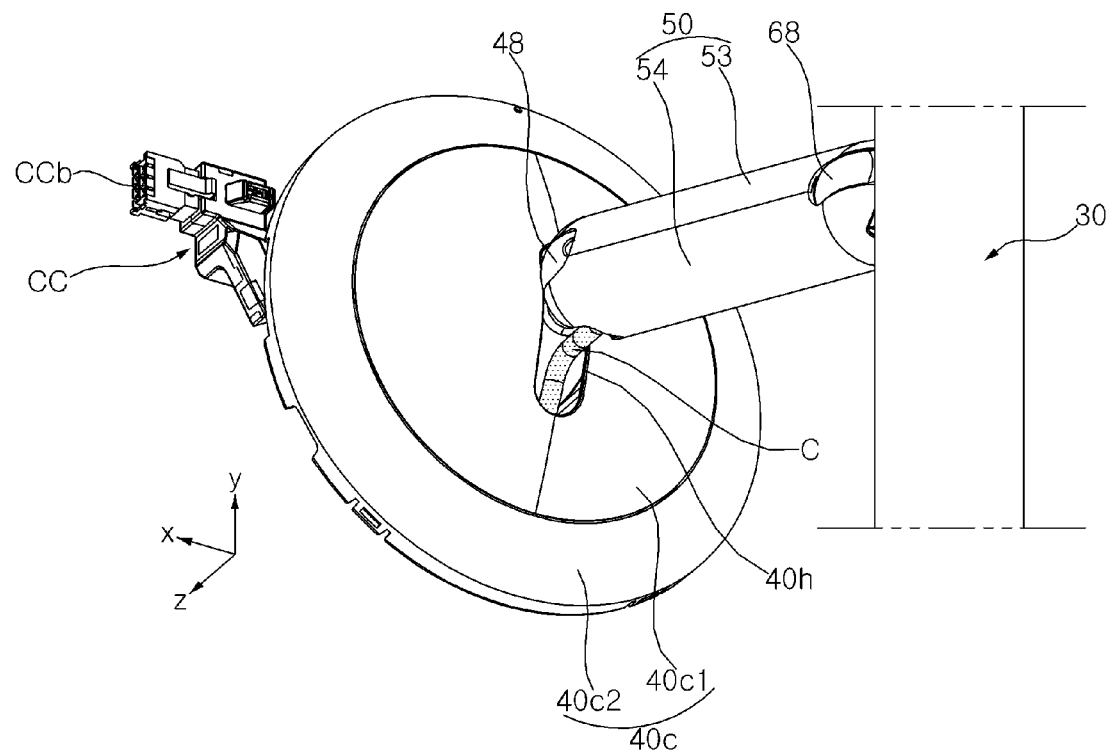
Figure 19:
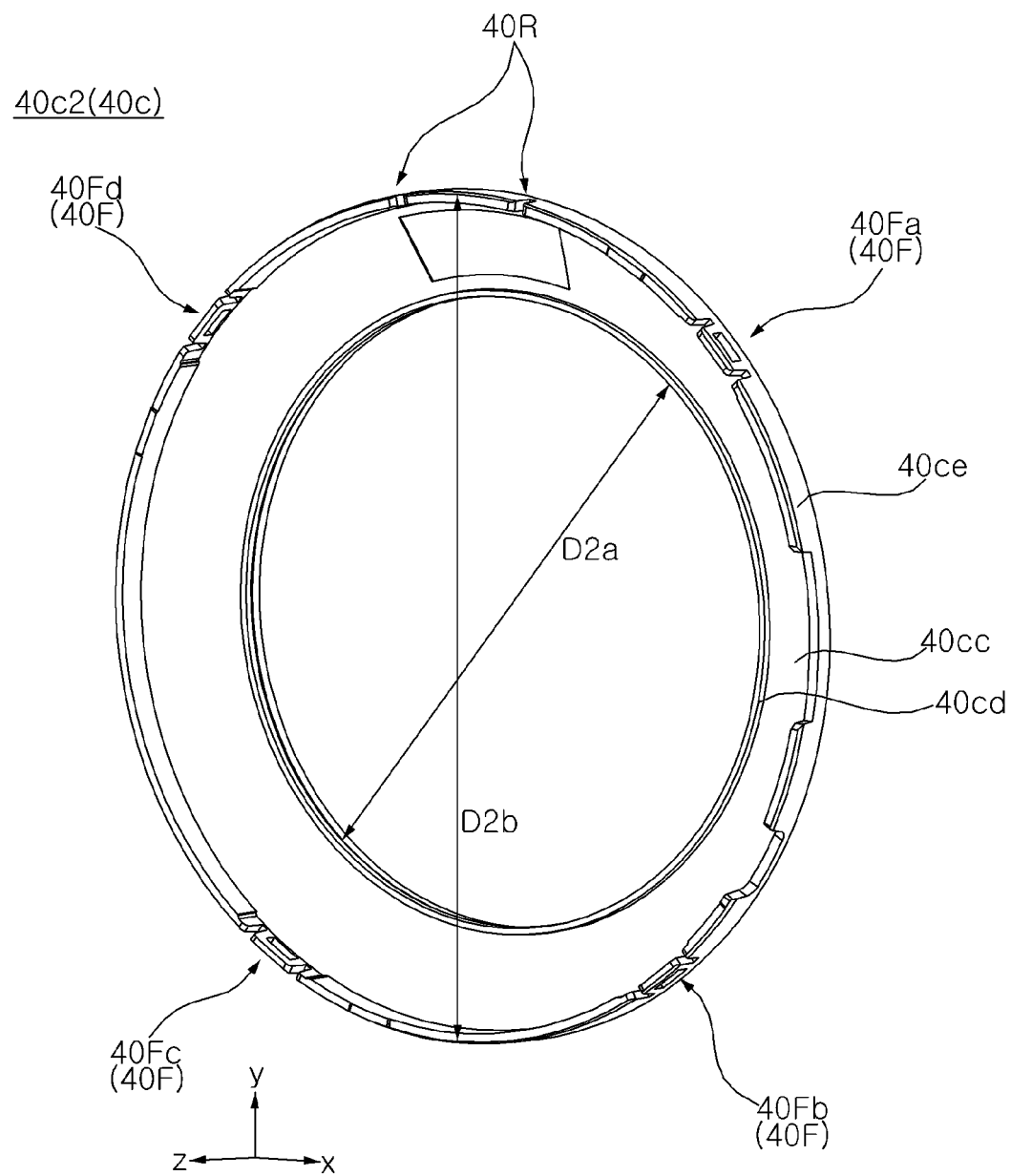
Figure 20:
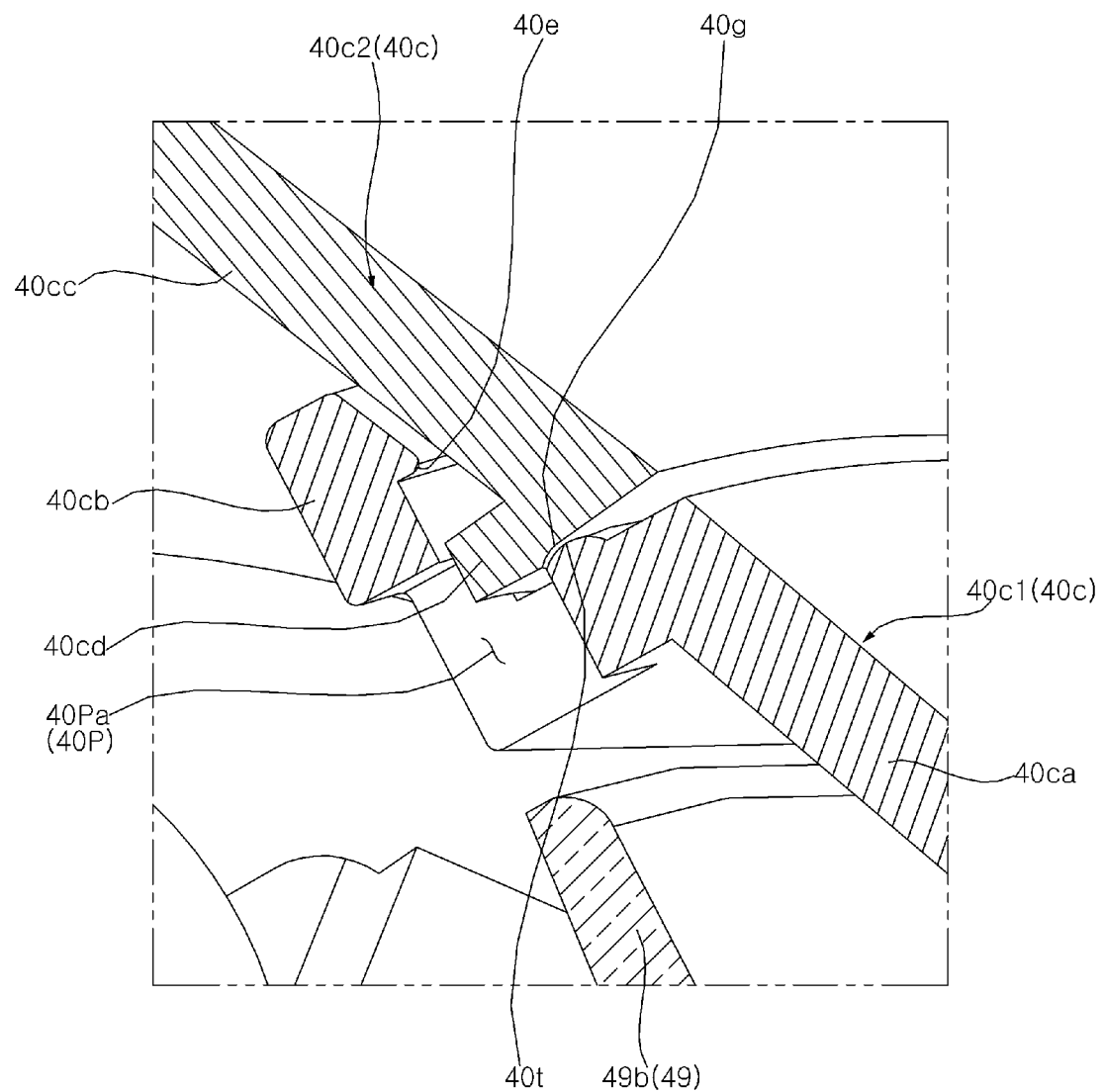

Referring to FIGS. 18 to 20, an outer cover 40*c*2 of the cover 40*c* may have a ring shape as a whole. For example, the outer cover 40*c*2 may include a plastic material. The outer cover 40*c*2 may include an outer body 40*cc*, a first rim 40*cd*, and a second rim 40*ce*.

The outer body 40*cc* may have a ring shape. The first rim 40*cd* may protrude in a forward direction from the inner circumference of the outer body 40*cc*, and define the inner diameter D2*a* of the outer cover 40*c*2. The second rim 40*ce* may protrude in a forward direction from the outer circumference of the outer body 40*cc*, and define the outer diameter D2*b* of the outer cover 40*c*2. The inner diameter D2*a* of the outer cover 40*c*2 may be slightly smaller than the outer diameter D1 (see FIG. 17) of the inner cover 40*cl* (see FIG. 20). The rim 40*cd*, 40*ce* may be referred to as vertical rims.

An inner coupling groove 40*g* may be formed in the inner circumference of the first rim 40*cd*, and may extend along the circumferential direction of the first rim 40*cd*. The inner coupling groove 40*g* may be located between the front and rear ends of the first rim 40*cd*. The inner coupling groove 40*g* may be referred to as an inner latch groove.

At this time, the first rim 40*cd* of the outer cover 40*c*2 may be located in a rear of the rim 40*cb* of the inner cover 40*c*1, and the distal end of the first rim 40*cd* may be located in the insertion groove 40P. In addition, the inner coupling groove 40*g* may be caught on the inner coupling projection 40*t*. A stopper 40*e* may protrude toward the outer body cc from the rear surface of the rim 40*cb*. In the radial direction of the cover 40*c*, the first rim 40*cd* may be located between the stopper 40*e* and the insertion groove 40P.

Accordingly, the outer cover 40*c*2 may be detachably coupled to the inner cover 40*c*1. The inner coupling groove 40*g* may slide on the inner coupling projection 40*t*. That is, the outer cover 40*c*2 may be rotatably coupled to the inner cover 40*c*1 in the circumferential direction of the outer cover 40*c*2. The stopper 40*e* may restrict the outer cover 40*c*2 coupled to the inner cover 40*c*1 from moving in the radial direction of the cover 40*c*.

Referring back to FIGS. 9 and 10, a top projection 42*a* may protrude upward from the upper side of the front bracket 42. A first top projection 42*a*1 may be adjacent to the left side of the front bracket 42. A second top projection 42*a*2 may be adjacent to the right side of the front bracket 42.

A bottom projection 42*b* may protrude downward from the lower side of the front bracket 42. A first bottom projection 42*b*1 may be adjacent to the left side of the front bracket 42. A second bottom projection 42*b*2 may be adjacent to the right side of the front bracket 42.

The first top projection 42*a*1, the second top projection 42*a*2, the first bottom projection 42*b*1, and the second bottom projection 42*b*2 may be located at corners of the front bracket 42.

The first bottom projection 42*b*1 may correspond to the first bottom hole 41*b*1. The first bottom projection 42*b*1 may be inserted into a space between the rear surface of the second recessed portion 411 and the front surface of the first hooking portion 1831*a*, and may be caught on the front surface of the first hooking portion 1831*a*.

The second bottom projection 42*b*2 may correspond to the second bottom hole 41*b*2. The second bottom projection 42*b*2 may be inserted into a space between the rear surface of the second recessed portion 411 and the front surface of the second hooking portion 1832*a*, and may be caught on the front surface of the second hooking portion 1832*a*.

The first top projection 42*a*1 may correspond to the first top hole 41*a*1. The first top projection 42*a*1 may be inserted into the first top hole 41*a*1 and may be caught on the sidewall of the second recessed portion 411 defining the boundary of the first top hole 41*a*1.

The second top projection 42*a*2 may correspond to the second top hole 41*a*2. The second top projection 42*a*2 may be inserted into the second top hole 41*a*2, and may be caught on the sidewall of the second recessed portion 411 defining the boundary of the second top hole 41*a*2.

Figure 21:
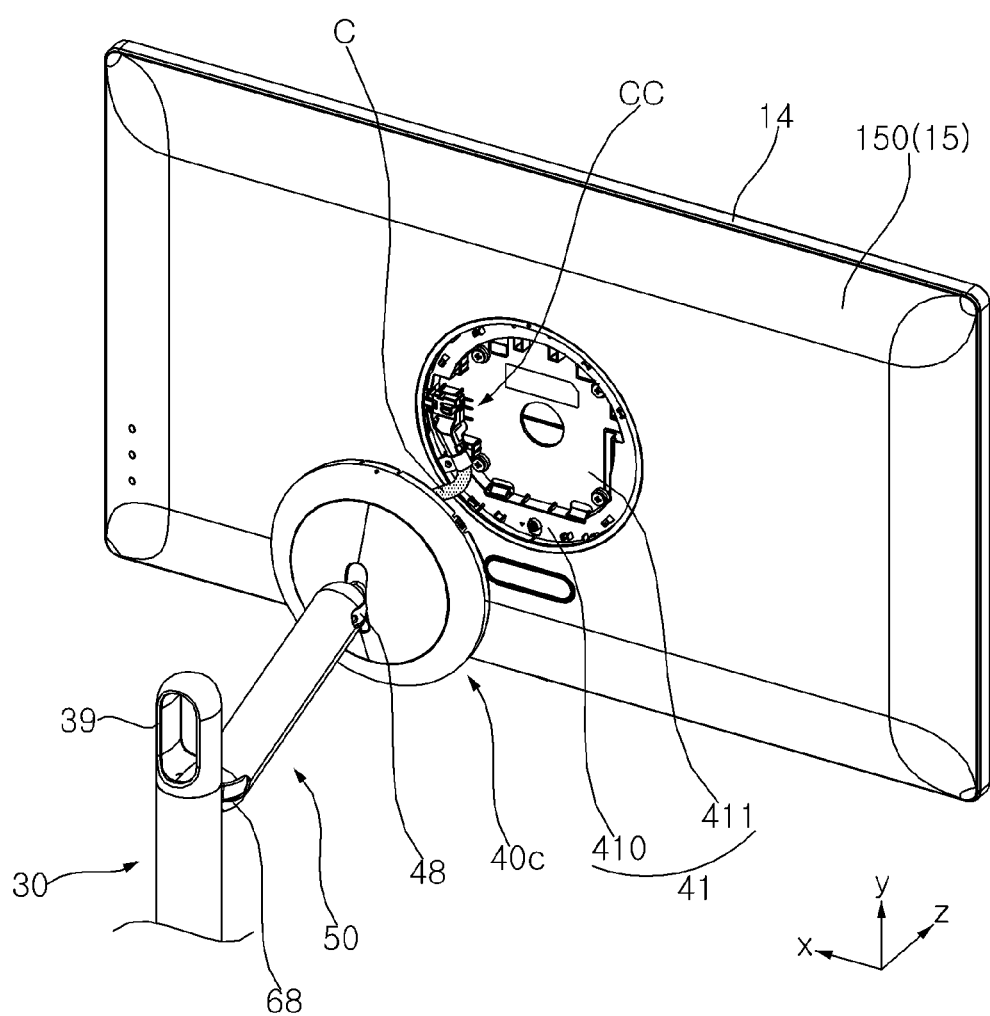
Figure 22:
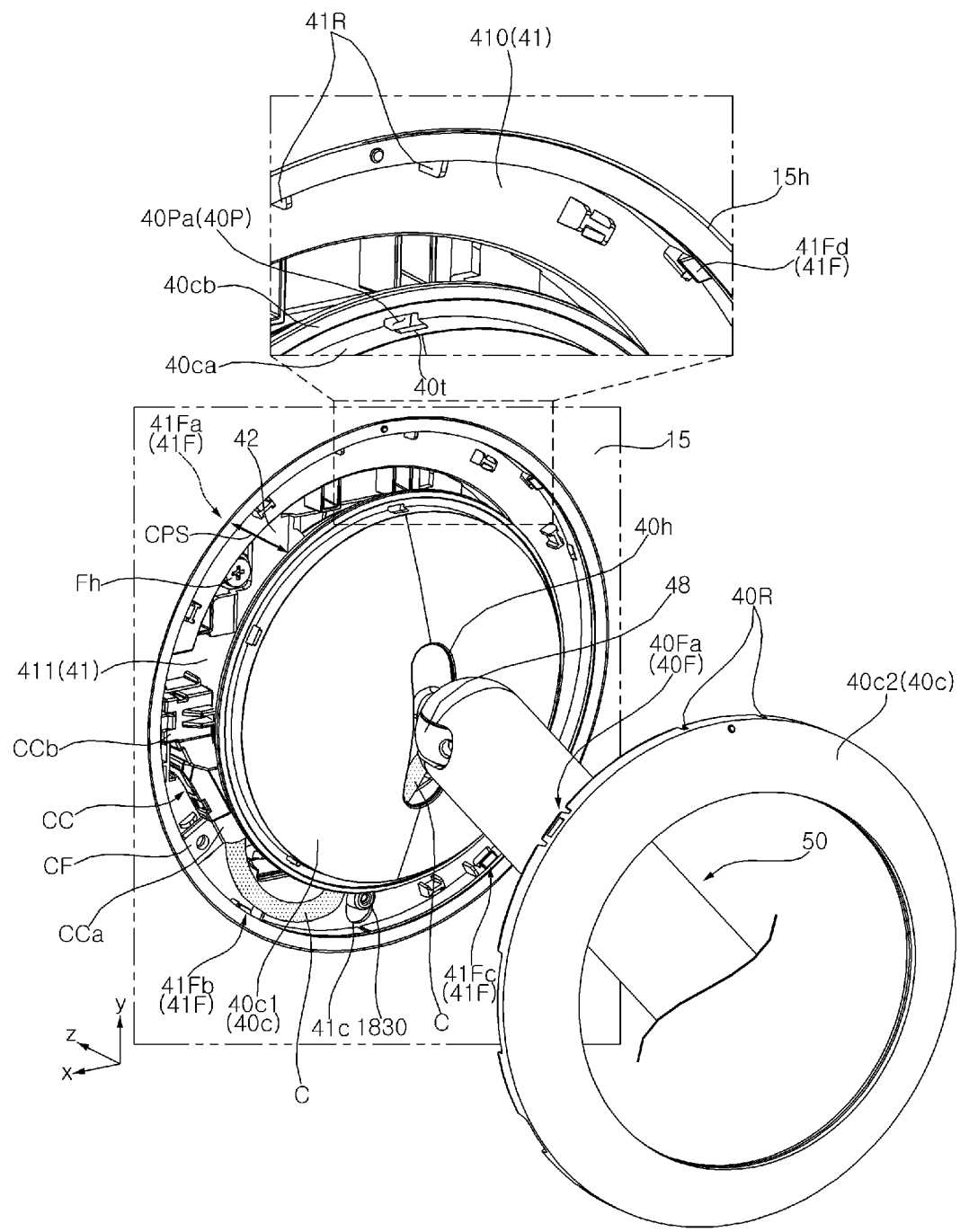

Referring to FIGS. 21 and 22, as described above with reference to FIGS. 9 and 10, the front bracket 42 may be detachably coupled to the second recessed portion 411 of the fixing plate 41.

A cable path CPS may be defined between the inner cover 40*cl* covering the rear of the front bracket 42 and the hole 15*h* of the back cover 15. The cable path CPS may be defined between the outer circumference of the cable reel 49 and the outer circumference of the first recessed portion 411. The cable path CPS may be referred to as a cable placement space.

One end CCa of the cable head CC may be fixed to the distal end of the cable C. The other end CCb of the cable head CC may penetrate the sidewall of the second recessed portion 411 of the fixing plate 41, and may be electrically connected to the terminal provided in one side (e.g. the right side) of the power supply board PSU (see FIG. 6). The cable head CC may be detachably coupled to the first recessed portion 410 of the fixing plate 41 through the cable holder CF. For example, a fastening member such as a screw may be fastened to the first recessed portion 410 through the cable holder CF.

A part of the cable C may be located in a cable path CPS. A part of the cable C may move within the cable path CPS according to the movement of the fixing plate 41 corresponding to the pivot movement of the head 10 (see FIGS. 8 and 9) and the cable head CC fixed thereto. In other words, the cable path CPS may provide a space in which a part of the cable C whose degree of being wound around the cable reel 49 (see FIG. 15) is changed in response to the pivot movement of the head 10 (see FIGS. 8 and 9) is located.

Referring to FIGS. 19 and 22, a slit 40R may be formed in the second rim 40*ce* of the outer cover 40*c*2. The slit 40R may be formed from the front end of the second rim 40*ce* toward the rear end of the second rim 40*ce*. For example, the slit 40R may be formed above the second rim 40*ce*. For example, the slit 40R may include a plurality of slits 40R spaced apart from each other in the circumferential direction of the second rim 40*ce*.

The rib 41R may protrude in a rearward direction from the rear surface of the first recessed portion 410 of the rear plate 41. In the front-rear direction, the rib 41R may be aligned with the slit 40R, and may be inserted into the slit 40R.

An outer coupling groove 40F may be formed in the second rim 40*ce*. The outer coupling groove 40F may be formed by cutting out a part of the second rim 40*ce*. The outer coupling groove 40F may include a groove formed in the thickness direction of the second rim 40*ce*. The outer coupling groove 40F may be spaced apart from the slit 40R. For example, the outer coupling groove 40F may include a plurality of outer coupling grooves 40Fa, 40Fb, 40Fc, and 40Fd spaced apart from each other in the circumferential direction of the second rim 40*ce*. For example, in the circumferential direction of the second rim 40*ce*, the plurality of outer coupling grooves 40Fa, 40Fb, 40Fc, and 40Fd may be spaced apart from each other at a certain angle. The outer coupling groove 40F may be referred to as an outer latch groove.

An outer coupling projection 41F may be formed on a sidewall of the first recessed portion 410. The outer coupling projection 41F may protrude toward the center of the fixing plate 41 from the sidewall of the first recessed portion 410. For example, the outer coupling projection 41F may include a plurality of outer coupling projections 41Fa, 41Fb, 41Fc, and 41Fd spaced apart from each other in the circumferential direction of the first recessed portion 410. The outer coupling projection 41F may be referred to as an outer latch projection.

In addition, the outer coupling projection 41F may correspond to the outer coupling groove 40F. In the radial direction of the fixing plate 41, the outer coupling projection 41F may be aligned with the outer coupling groove 40F, and may be inserted into the outer coupling groove 40F.

Accordingly, the outer cover 40*c*2 may be detachably coupled to the first recessed portion 410 when the outer coupling groove 40F is caught on the outer coupling projection 41F. The rib 41R and the slit 40R may guide the coupling of the outer cover 40*c*2 and the fixing plate 41. The outer cover 40*c*2 may cover the cable path CPS.

Furthermore, a user may separate the outer cover 40*c*2 from the cover 40*c*, attach the cable head CC to the fixing plate 40 or separate the cable head CC from the fixing plate 40, and place a part of the cable C in the cable path CPS. That is, as the outer cover 40*c*2 is detachably coupled to the fixing plate 41, work convenience may be improved.

In addition, the outer cover 40 may be coupled to the back cover 15 of the head 10 that pivots and the inner cover 40*c*1 that does not pivot, at between them.

For example, as described above, the inner circumference of the outer cover 40*c*2 may be rotatably coupled to the outer circumference of the inner cover 40*c*1 in the pivotal movement direction of the head 10, and the outer circumference of the outer cover 40*c*2 may be fixed to the back cover 15 through the fixing plate 41. Accordingly, the outer cover 40*c*2 may be pivoted along with the head 10.

For another example, the inner circumference of the outer cover 40*c*2 may be fixed to the outer circumference of the inner cover 40*c*1, and the outer circumference of the outer cover 40*c*2 may be rotatably coupled to the back cover 15 through the fixing plate 41 in the pivot movement direction. Accordingly, the head 10 may pivot with respect to the inner cover 40*c*1 and the outer cover 40*c*2.

At this time, the fixing structure of the outer cover 40*c*2 and the inner cover 40*c*1 may use the fixing structure of the outer cover 40*c*2 and the fixing plate 41 described above with reference to FIGS. 19 and 22, and the coupling structure of the outer cover 40*c*2 and the fixing plate 41 may use the coupling structure of the outer cover 40*c*2 and the inner cover 40*c*1 described above with reference to FIG. 20.

For another example, the inner circumference of the outer cover 40*c*2 may be rotatably coupled to the outer circumference of the inner cover 40*c*1 in the pivot movement direction of the head 10, and the outer circumference of the outer cover 40c2 may be rotatably coupled to the back cover 15 through the fixing plate 41 in the pivot movement direction of the head 10. Accordingly, the inner and outer circumferences of the outer cover 40c2 may not be constrained by the inner cover 40c1 and the back cover 15 in the pivot movement direction of the head 10. At this time, both the coupling structure of the outer cover 40c2 and the inner cover 40c1 and the coupling structure of the outer cover 40c2 and the fixing plate 41 may use the coupling structure of the outer cover 40c2 and the inner cover 40c1 described above with reference to FIG. 20.

Accordingly, the inner and outer circumferences of the outer cover 40c2 may be coupled or fixed to the inner cover 40c1 and the fixing plate 41, and the coupling stability of the outer cover 40c2 may be improved. In addition, the outer cover 40c2 may be coupled to the inner cover 40c1 and the fixing plate 41 without a separate fastening member such as a screw, and work convenience may be improved.

Figure 23:
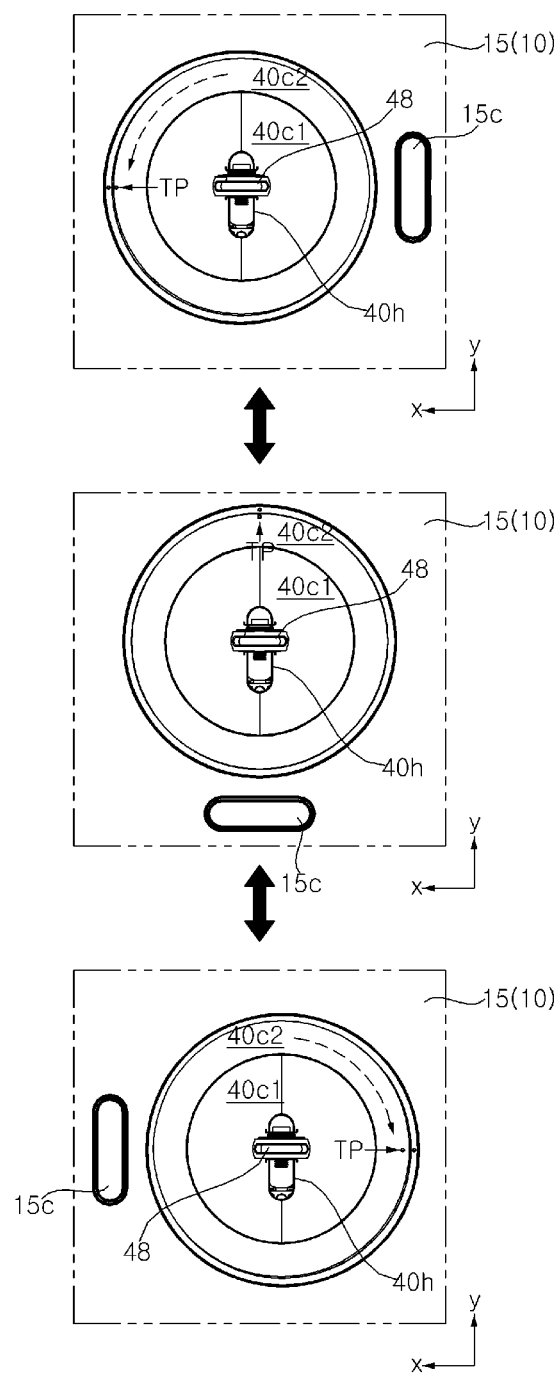
Figure 24:
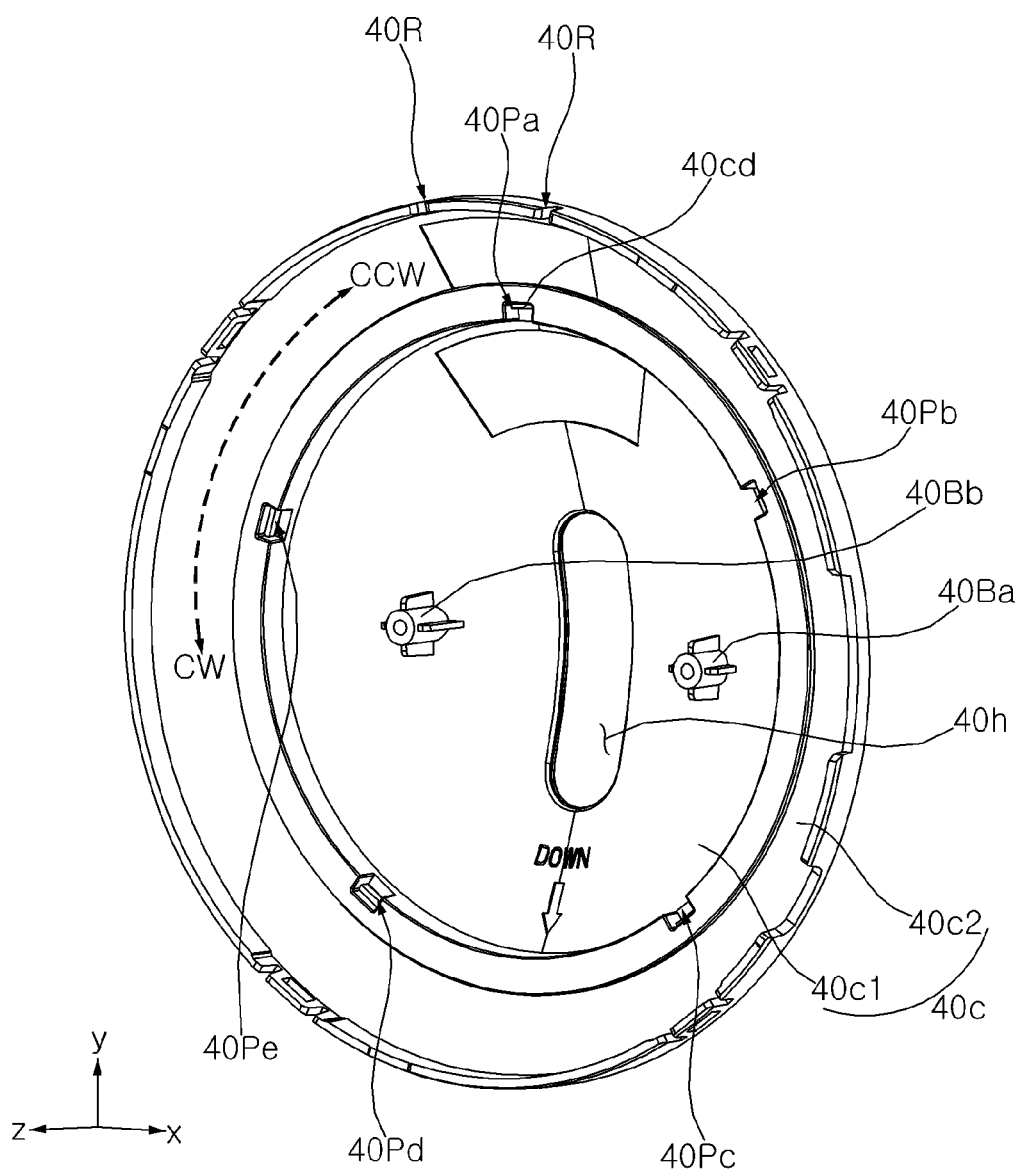

Referring to FIGS. 23 and 24, the head 10 and the outer cover 40c2 may rotate clockwise CW or counterclockwise CCW with respect to the inner cover 40c1.

Referring to the upper drawing of FIG. 23, based on the middle drawing of FIG. 23, the outer cover 40c2 may rotate counterclockwise CCW from 0 degrees to −90 degrees (see TP).

Referring to the bottom drawing of FIG. 23, based on the middle drawing of FIG. 23, the outer cover 40c2 may rotate counterclockwise from 0 degrees to +90 degrees (see TP).

Figure 25:
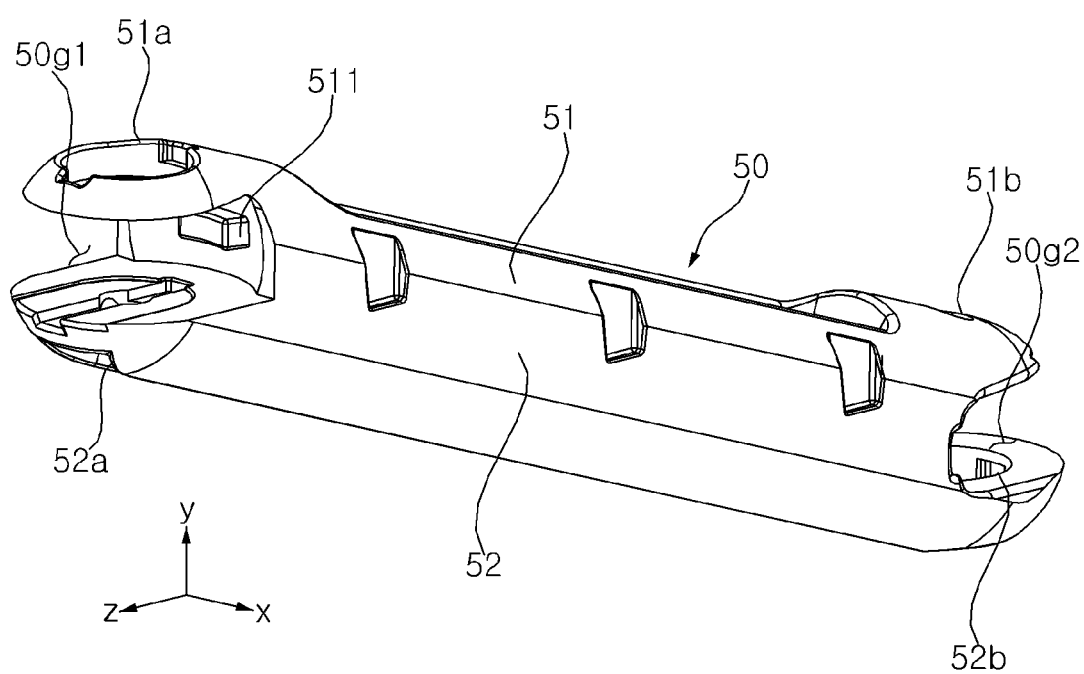
Figure 26:
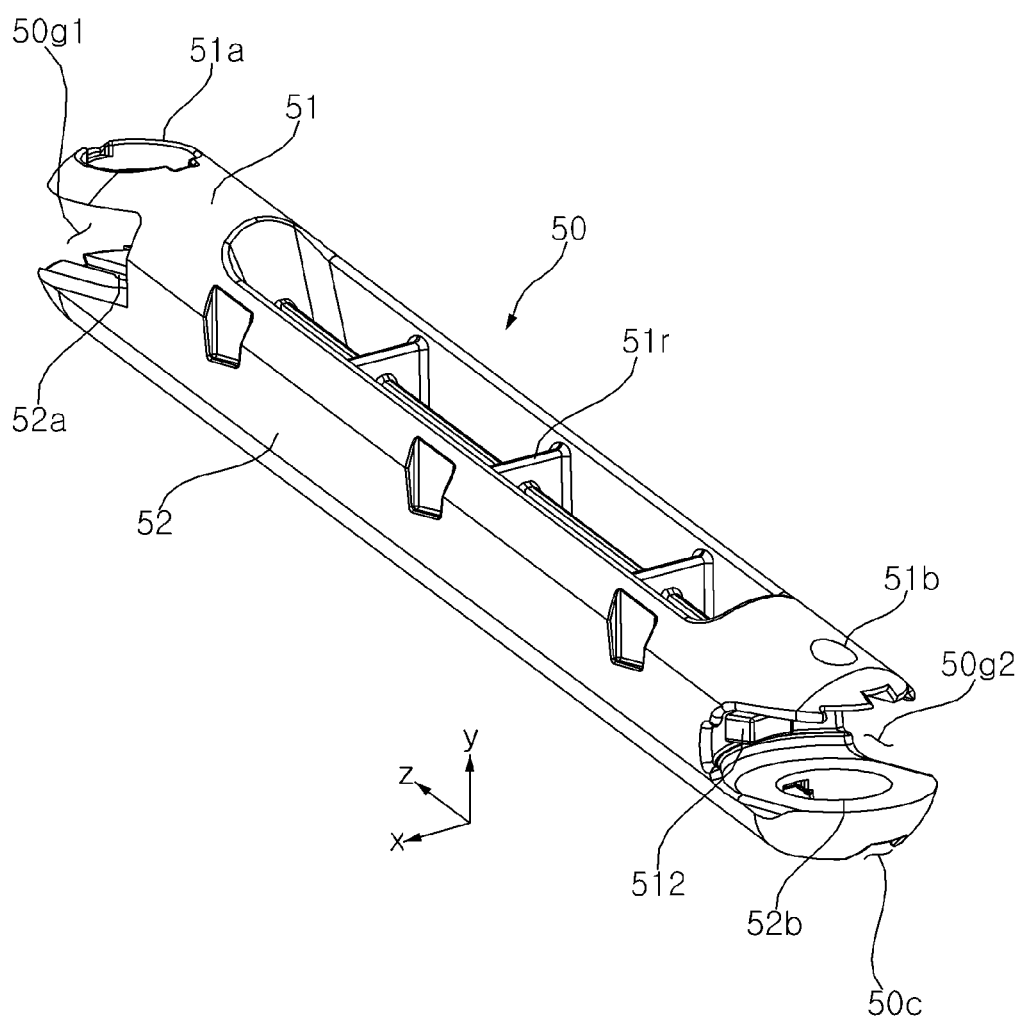

Referring to FIGS. 25 and 26, the arm 50 may include an arm body 51, 52. An upper arm body 51 and a lower arm body 52 may be coupled to each other. The arm 50 may be referred to as a rod 50 or a link 50.

The front portion of the upper arm body 51 may be spaced upward from the front portion of the lower arm body 52. A front groove 50g1 may be formed in the front portion of the arm body 51, 52 and may have a "U" shape opened in a forward direction. The rear portion of the upper arm body 51 may be spaced upward from the rear portion of the lower arm body 52. A rear groove 50g2 may be formed in the rear portion of the arm body 51, 52, and may have a "U" shape opened in a rearward direction.

An upper insertion hole 51a may be formed to penetrate the front portion of the upper arm body 51 in a vertical direction, and may face the front groove 50g1. An upper fastening hole 51b may be formed to penetrate the rear portion of the upper arm body 51 in a vertical direction, and may face the rear groove 50g2.

A lower fastening hole 52a may be formed to penetrate the front portion of the lower arm body 52 in a vertical direction, and may be aligned with the upper insertion hole 51a. A lower insertion hole 52b may be formed to penetrate the rear portion of the lower arm body 52 in a vertical direction, and may be aligned with the upper fastening hole 51b.

A cable groove 50c may be formed in a lower surface of the lower arm body 52, and may extend along the longitudinal direction of the lower arm body 52. A cable C (see FIG. 15) may be located in the cable groove 50c.

Figure 27:
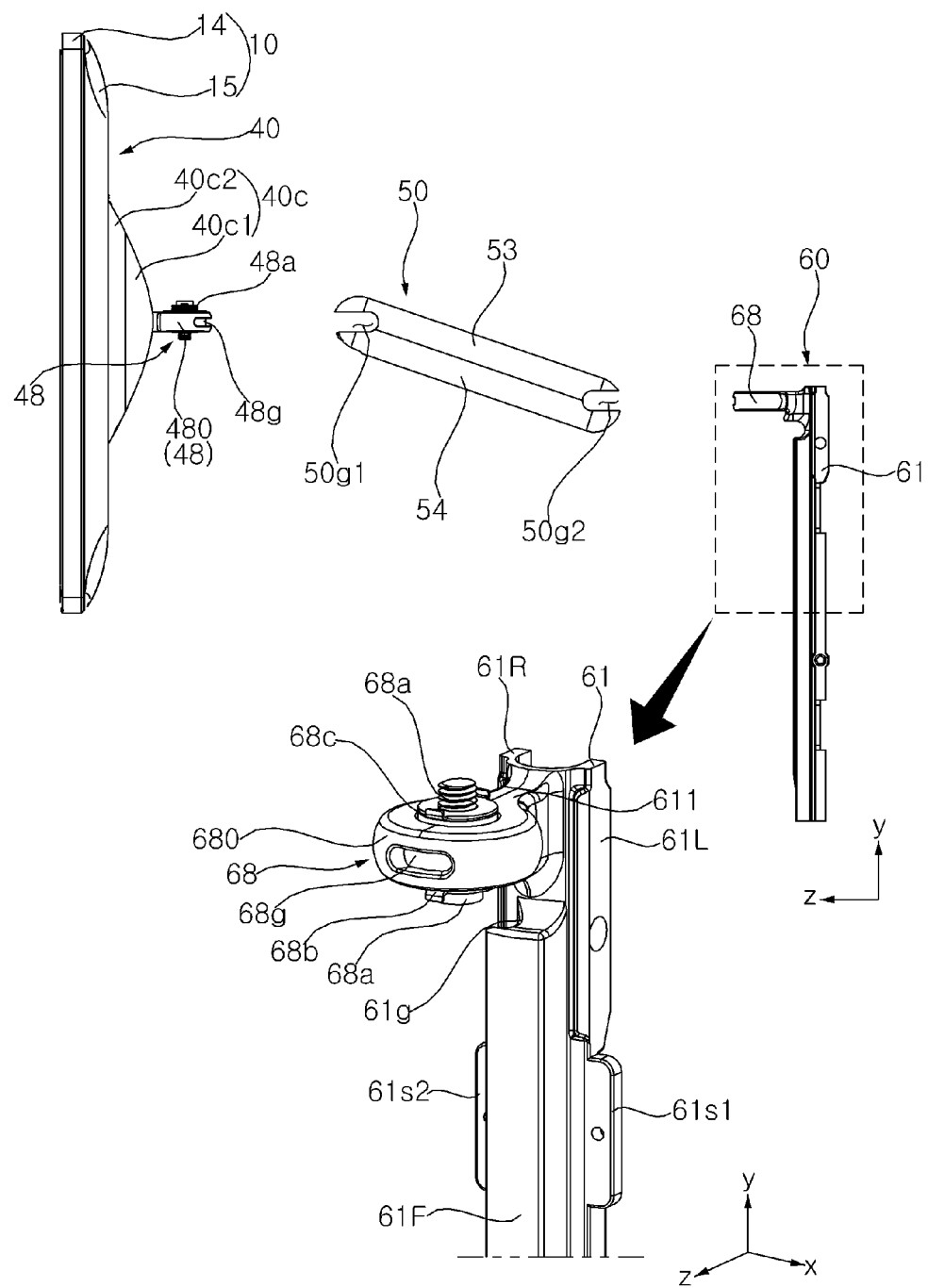

Referring to FIG. 27, the upper cover 53 may cover the surface of the upper arm body 51 (see FIG. 26). The lower cover 54 may cover the surface of the lower arm body 52 (see FIG. 26). The upper cover 53 and the lower cover 54 may be formed separately, or formed as one body.

The first rotation unit 48 may be inserted into the front groove 50g1, and rotatably coupled to the arm 50. The second rotation unit 68 may be inserted into the rear groove 50g2, and rotatably coupled to the arm 50. The second rotation unit 68 may protrude toward the rear groove 50g2 from a vertical member 61 described later.

Figure 28:
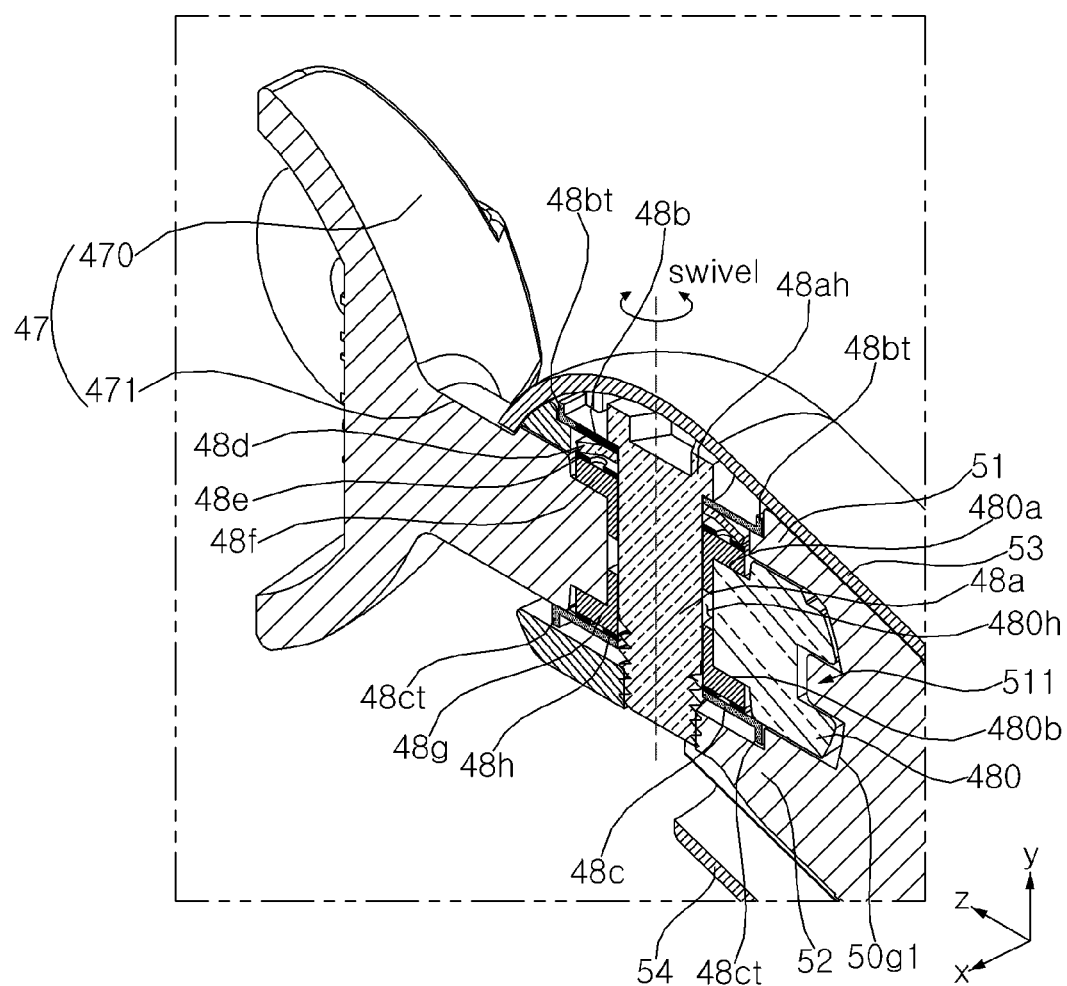

Referring to FIGS. 27 and 28, the first rotation unit 48 may include a first body 480, a first fastening member 48a, a first upper fixing washer 48b, a first disc spring 48d, a first upper washer 48e, a first upper bushing 48f, a first lower bushing 48g, a first lower washer 48h, and a first lower fixing washer 48c. The first rotation unit 48 may be referred to as a first swivel unit 48 or a first swivel module 48.

The first body 480 may be opened vertically. The first body 480 may have a donut shape as a whole. For example, the first body 480 and the first connection portion 471 may be formed as one body. The first body 480 may be inserted into the front groove 50g1.

The first fastening member 48a may extend in a vertical direction. The first fastening member 48a may be inserted into the arm 50 through the upper insertion hole 51a (see FIG. 26), and penetrate the hole 480h formed in the center of the first body 480. The head 48ah of the first fastening member 48a may be located inside the upper arm body 51. The first fastening member 48a may be screwed into the lower fastening hole 52a (see FIG. 26).

The first upper fixing washer 48b may be located below the head 48ah of the first fastening member 48a, and penetrated by the first fastening member 48a. The first upper fixing washer 48b may be a toothed lock washer, and a tooth 48bt of the first upper fixing washer 48b may be inserted and fixed to a groove formed inside the upper arm body 51.

The first disc spring 48d may be located below the first upper fixing washer 48b. The first disc spring 48d may be convex toward the first upper fixing washer 48b and generate an elastic force in the axial direction of the first fastening member 48a.

The first upper washer 48e may be located below the first disc spring 48d, and penetrated by the first fastening member 48a.

The first upper bushing 48f may face the first disc spring 48d with respect to the first upper washer 48e. The first fastening member 48a may penetrate the first upper bushing 48f. The first upper bushing 48f may have a cylindrical shape in which a flange (no reference numeral) is formed at an upper end. The flange of the first upper bushing 48f may contact the first upper groove 480a formed along the periphery of the hole 480h on the upper surface of the first body 480. A part (no reference numeral) of the first upper bushing 48f may be inserted into the hole 480h of the first body 480, and may be located between the inner circumferential surface of the first body 480 and the outer circumferential surface of the first fastening member 48a.

The first lower bushing 48g may face the first upper bushing 48f and may be spaced downward from the first upper bushing 48f. The first fastening member 48a may penetrate the first lower bushing 48g. The first lower bushing 48g may have a cylindrical shape in which a flange (no reference numeral) is formed at a lower end. The flange of the first lower bushing 48g may contact the first lower groove 480b formed along the periphery of the hole 480h on the lower surface of the first body 480. A part (no reference numeral) of the first lower bushing 48g may be inserted into the hole 480h of the first body 480, and may be located between the inner circumferential surface of the first body 480 and the outer circumferential surface of the first fastening member 48a.

The first lower washer 48h may be located below the first lower bushing 48g, and penetrated by the first fastening member 48a.

The first lower fixing washer 48c may face the first lower bushing 48g with respect to the first lower washer 48h, and may be penetrated by the first fastening member 48a. The first lower fixing washer 48c may be a toothed lock washer, and a tooth 48ct of the first lower fixing washer 48c may be inserted and fixed to a groove formed in the inner side of the lower arm body 52.

Accordingly, the first body 480 may rotate with respect to the first fastening member 48a. That is, the first fastening member 48a may provide a first swivel shaft. In addition, due to the elastic force of the first disc spring 48d described above, the head 10 may maintain a certain swivel angle unless an external force of a certain level or higher is applied.

Figure 29:
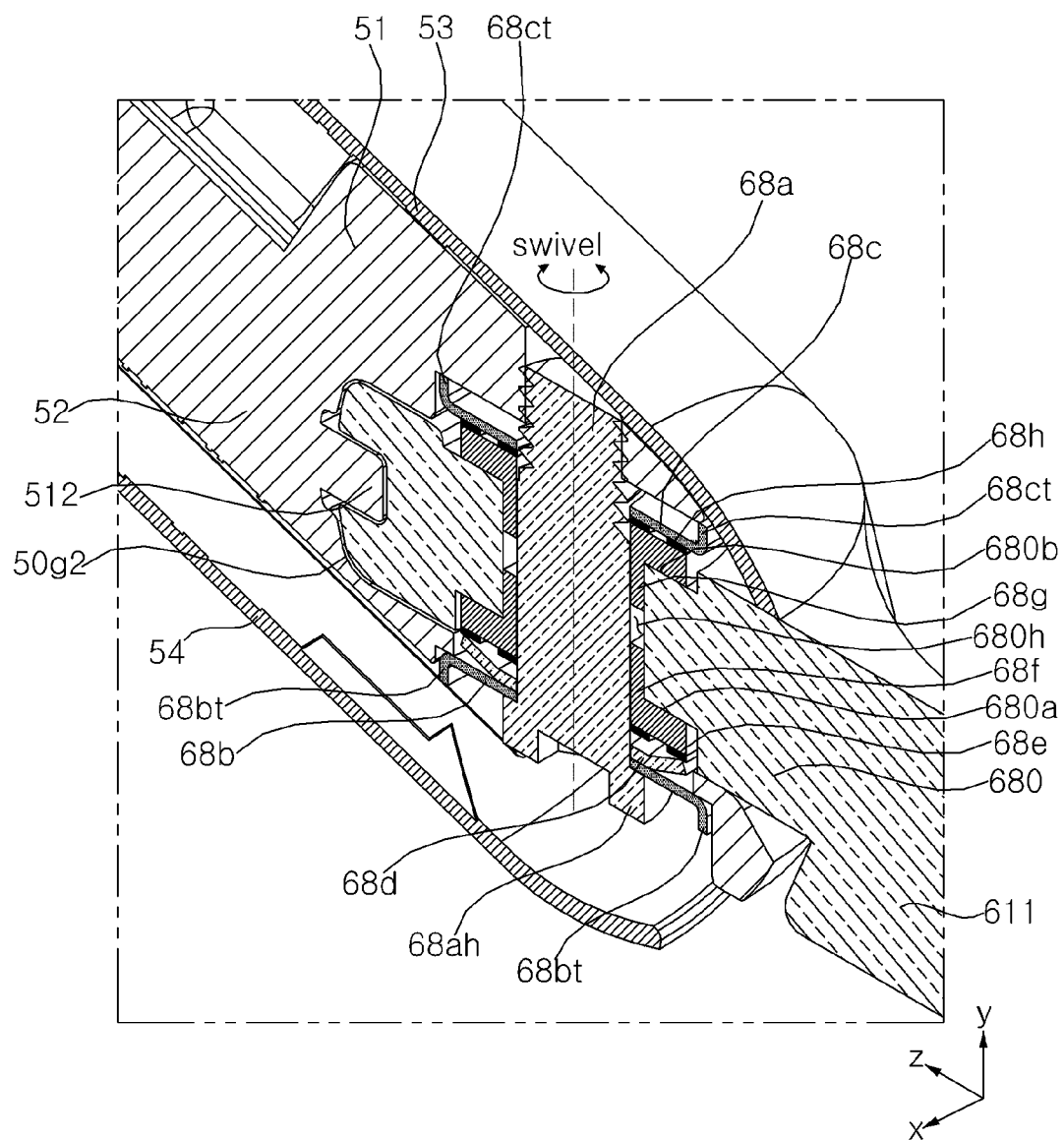

Referring to FIGS. 27 and 29, the second rotation unit 68 may include a second body 680, a second fastening member 68a, a second lower fixing washer 68b, a second disc spring 68d, a second lower washer 68e, a second lower bushing 68f, a second upper bushing 68g, a second upper washer 68h, and a second upper fixing washer 68c. The second rotation unit 68 may be referred to as a second swivel unit 68 or a second swivel module 68.

The second body 680 may be opened vertically. The second body 680 may have a donut shape as a whole. The second body 680 may be connected to the vertical member 61 through a second connection portion 611. For example, the second body 680, the second connection portion 611, and the vertical member 61 may be formed as one body. The second body 680 may be inserted into the rear groove 50g2.

The second fastening member 68a may extend in a vertical direction. The second fastening member 68a may be inserted into the arm 50 through the lower insertion hole 52b (see FIG. 26) and penetrate the hole 680h formed in the central portion of the second body 680. The head 68ah of the second fastening member 68a may be located inside the lower arm body 52. The second fastening member 68a may be screwed into the upper fastening hole 51b (see FIG. 26).

The second lower fixing washer 68b may be located above the head 68ah of the second fastening member 68a and penetrated by the second fastening member 68a. The second lower fixing washer 68b may be a toothed lock washer, and a tooth 68bt of the second lower fixing washer 68b may be inserted and fixed to a groove (no reference numeral) formed inside the lower arm body 52.

The second disc spring 68d may be located above the second lower fixing washer 68b. The second disc spring 68d may be convex toward the second lower fixing washer 68b and generate an elastic force in the axial direction of the second fastening member 68a.

The second lower washer 68e may be located above the second disc spring 68d and penetrated by the second fastening member 68a.

The second lower bushing 68f may face the second disc spring 68d with respect to the second lower washer 68e. The second fastening member 68a may penetrate the second lower bushing 68f. The second lower bushing 68f may have a cylindrical shape in which a flange (no reference numeral) is formed at a lower end thereof. The flange of the second lower bushing 68f may contact the second lower groove 680a formed along the periphery of the hole 680h on the lower surface of the second body 680. A part (no reference numeral) of the second lower bushing 68f may be inserted into the hole 680h of the second body 680, and may be located between the inner circumferential surface of the second body 680 and the outer circumferential surface of the second fastening member 68a.

The second upper bushing 68g may face the second lower bushing 68f and may be spaced upward from the second lower bushing 68f. The second fastening member 68a may penetrate the second upper bushing 68g. The second upper bushing 68g may have a cylindrical shape in which a flange (no reference numeral) is formed at an upper end thereof. The flange of the second upper bushing 68g may contact the second upper groove 680b formed along the periphery of the hole 680h on the upper surface of the second body 680. A part (no reference numeral) of the second upper bushing 68g may be inserted into the hole 680h of the second body 680, and may be located in between the inner circumferential surface of the second body 680 and the outer circumferential surface of the second fastening member 68a.

The second upper washer 68h may be located above the second upper bushing 68g and penetrated by the second fastening member 68a.

The second upper fixing washer 68c may face the second upper bushing 68g with respect to the second upper washer 68h and may be penetrated by the second fastening member 68a. The second upper fixing washer 68c may be a toothed lock washer, and a tooth 68ct of the second upper fixing washer 68c may be inserted and fixed to a groove (no reference numeral) formed inside the upper arm body 51.

Accordingly, the second body 680 may rotate with respect to the second fastening member 68a. That is, the second fastening member 68a may provide a second swivel shaft. In addition, due to the elastic force of the aforementioned second disc spring 68d, the head 10 can maintain a certain swivel angle unless an external force of a certain level or higher is applied.

Figure 30:
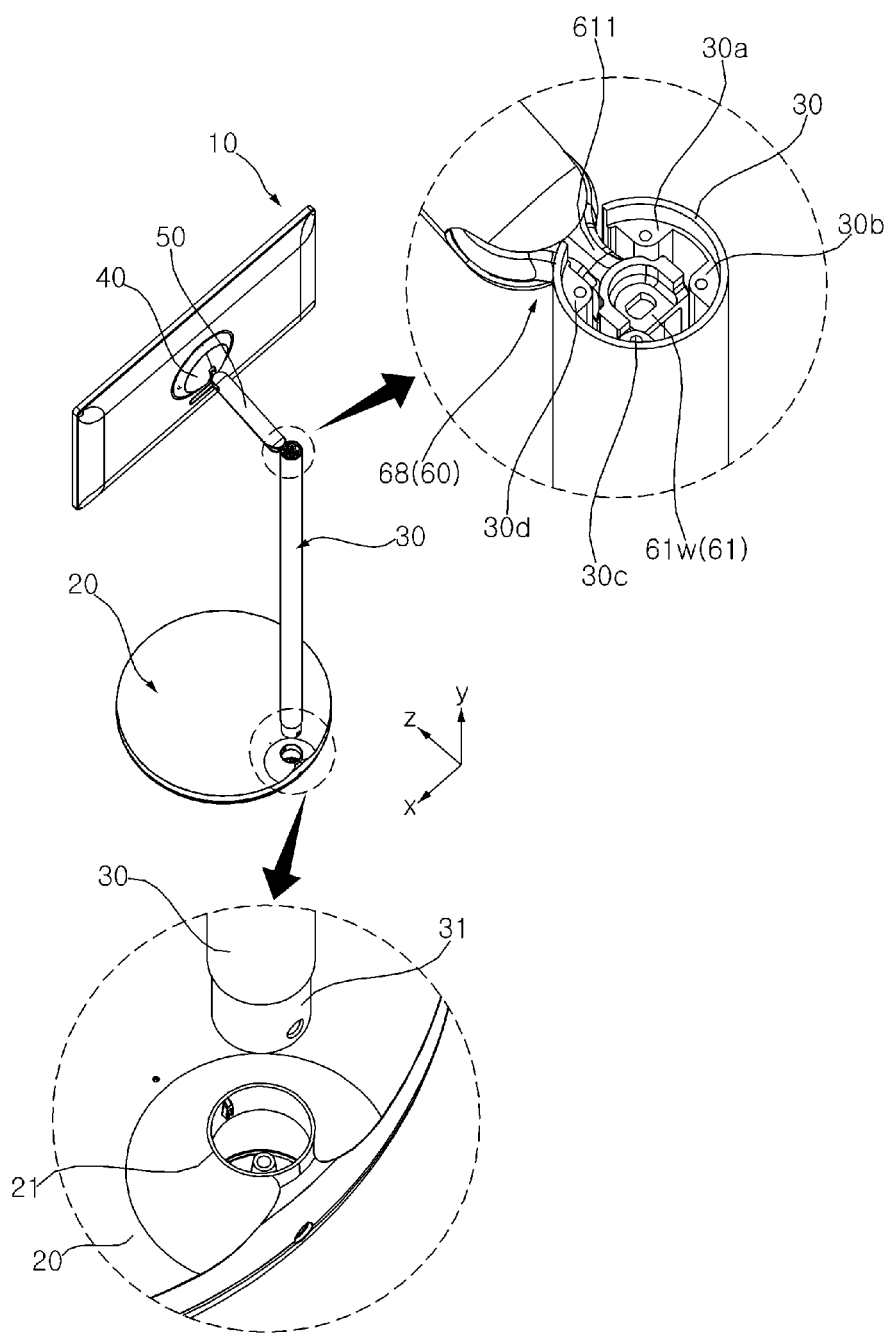

Referring to FIG. 30, the arm 50 may extend in a direction intersecting the head 10 and the pole 30. The arm 50 may connect the articulated connector 40 and the elevating module 60. The second rotation unit 68 of the elevating module 60 and the vertical member 61 may be connected through the second connection portion 611. The second connection portion 611 may penetrate the pole 30.

The vertical member 61 may extend in the longitudinal direction of the pole 30. The vertical member 61 may be accommodated inside the pole 30.

The pole 30 may extend in a vertical direction and may surround the vertical member 61. A plurality of ribs 30a, 30b, 30c, and 30d may protrude toward the vertical member 61 from the inner circumferential surface of the pole 30, and may be spaced apart from each other in the circumferential direction of the pole 30. The first rib 30a, the second rib 30b, the third rib 30c, and the fourth rib 30d may be located at arbitrary vertices of the quadrangular inside the pole 30.

In addition, the lower end 31 of the pole 30 may be inserted into and coupled to a port 21 formed on the upper surface of the base 20.

Figure 31:
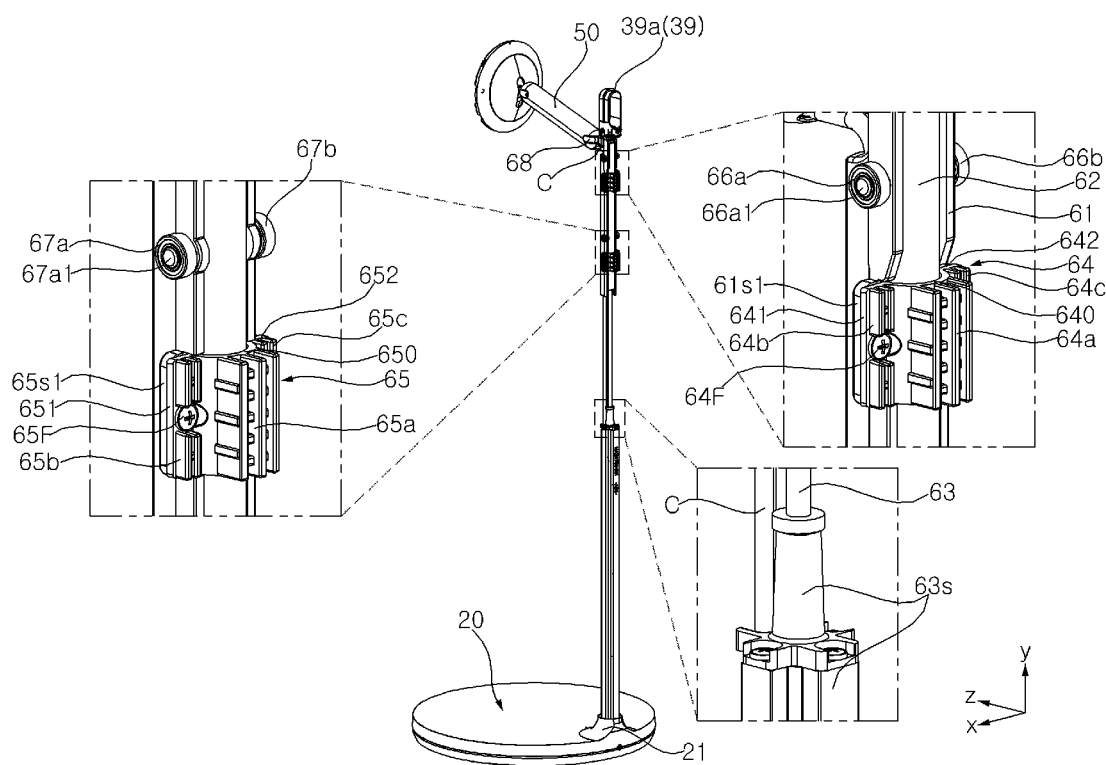

Referring to FIGS. 30 and 31, the vertical member 61 may have a cylindrical shape cut in half as a whole. The rear and lower sides of the vertical member 61 may be open, and the upper side may be blocked by a partition wall 61w. The stem 63s may extend in a vertical direction and may be aligned with the vertical member 61. The lower end of the stem 63s may be inserted into the port 21 of the base 20.

A gas spring 62, 63 may include an upper shaft 62 and a lower shaft 63 connected to the upper shaft 62. An upper shaft 62 may extend in the longitudinal direction of the vertical member 61. The upper shaft 62 may have a cylindrical shape in which an upper side is closed. At least a part of the upper shaft 62 may be accommodated inside the vertical member 61. A lower shaft 63 may extend in the longitudinal direction of the upper shaft 62 and may have a diameter smaller than a diameter of the upper shaft 62. That is, the lower shaft 63 may be inserted into the upper shaft 62. A lower end of the lower shaft 63 may be fixed on the stem 63s.

A clamp 64, 65 may face the vertical member 61 with respect to the upper shaft 62. In other words, the upper shaft 62 may be located between the vertical member 61 and the clamp 64, 65. For example, the clamp 64, 65 may include a plurality of clamps 64 and 65 spaced apart from each other in the vertical direction.

The clamp 64, 65 may include a semi-cylinder 640, 650, a left flange 641, 651, and a right flange 642, 652. The semi-cylinder 640, 650 may contact the outer circumference of the upper shaft 62. The left flange 641, 651 may extend to the left from one side of the semi-cylinder 640, 650, and may be coupled to a first portion 61s1, 65s1 of the vertical member 61 through a fastening member 64F, 65F. The right flange 642, 652 may extend to the right from the other side of the semi-cylinder 640, 650, and may be coupled to a second portion (not shown) of the vertical member 61 through a fastening member (not shown).

Accordingly, the upper shaft 62 may be detachably coupled to the vertical member 61 and may move downward or upward along the lower shaft 63.

Figure 32:
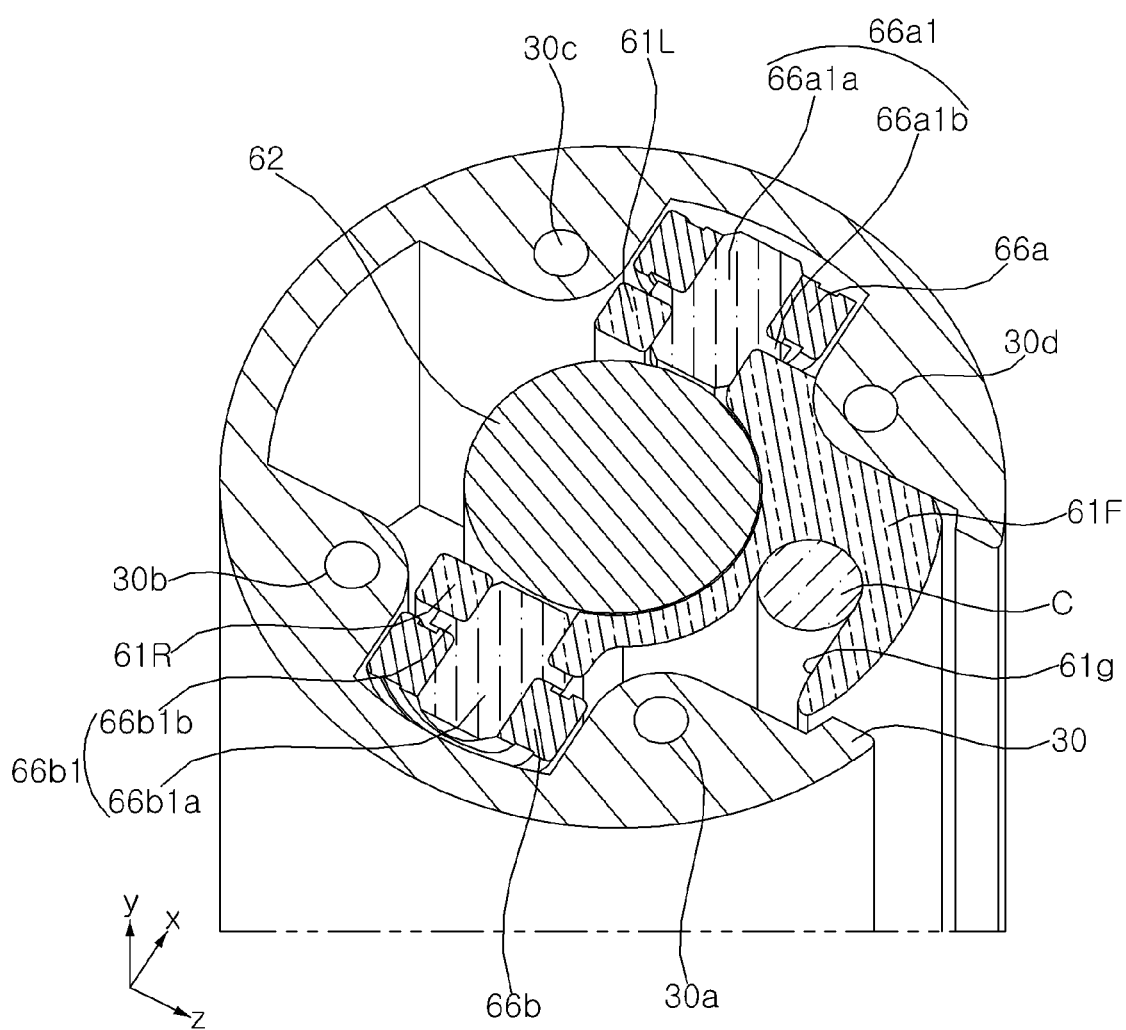

Referring to FIGS. 31 and 32, a roller 66a, 66b, 67a, 67b may be adjacent to the clamp 64, 65. For example, a first roller 66a, 66b may be adjacent to a first clamp 64, and a second roller 67a, 67b may be adjacent to a second clamp 65.

The first roller 66a, 66b may include a first left roller 66a and a first right roller 66b. A body 66a1a of a first left pin 66a1 may penetrate the first left roller 66a and a left portion 61L of the vertical member 61. A flange 66a1b of the first left pin 66a1 may be located between the first left roller 66a and the left portion 61L. The first left roller 66a may be coupled to the left portion 61L through the first left pin 66a1. A body 66b1a of a first right pin 66b1 may penetrate the first right roller 66b and a right portion 61R of the vertical member 61. A flange 66b1b of the first right pin 66b1 may be located between the first right roller 66b and the right portion 61R. The first right roller 66b may be coupled to the right portion 61R through the first right pin 66b1.

For example, the second roller 67a, 67b may have the same shape as the first roller 66a, 66b. That is, the above description of the first roller 66a, 66b may be identically applied to the second roller 67a, 67b. Accordingly, the second left roller 67a may be coupled to the left portion 61L, and the second right roller 67b may be coupled to the right portion 61R.

In addition, the left roller 66a, 67a may be located between the third rib 30c and the fourth rib 30d, and may contact the third rib 30c and the fourth rib 30d. The right roller 66b, 67b may be located between the first rib 30a and the second rib 30b, and may contact the first rib 30a and the second rib 30b.

Accordingly, the vertical member 61 may be smoothly lifted or lowered inside the pole 30 by the roller 66a, 66b, 67a, 67b.

Figure 33:
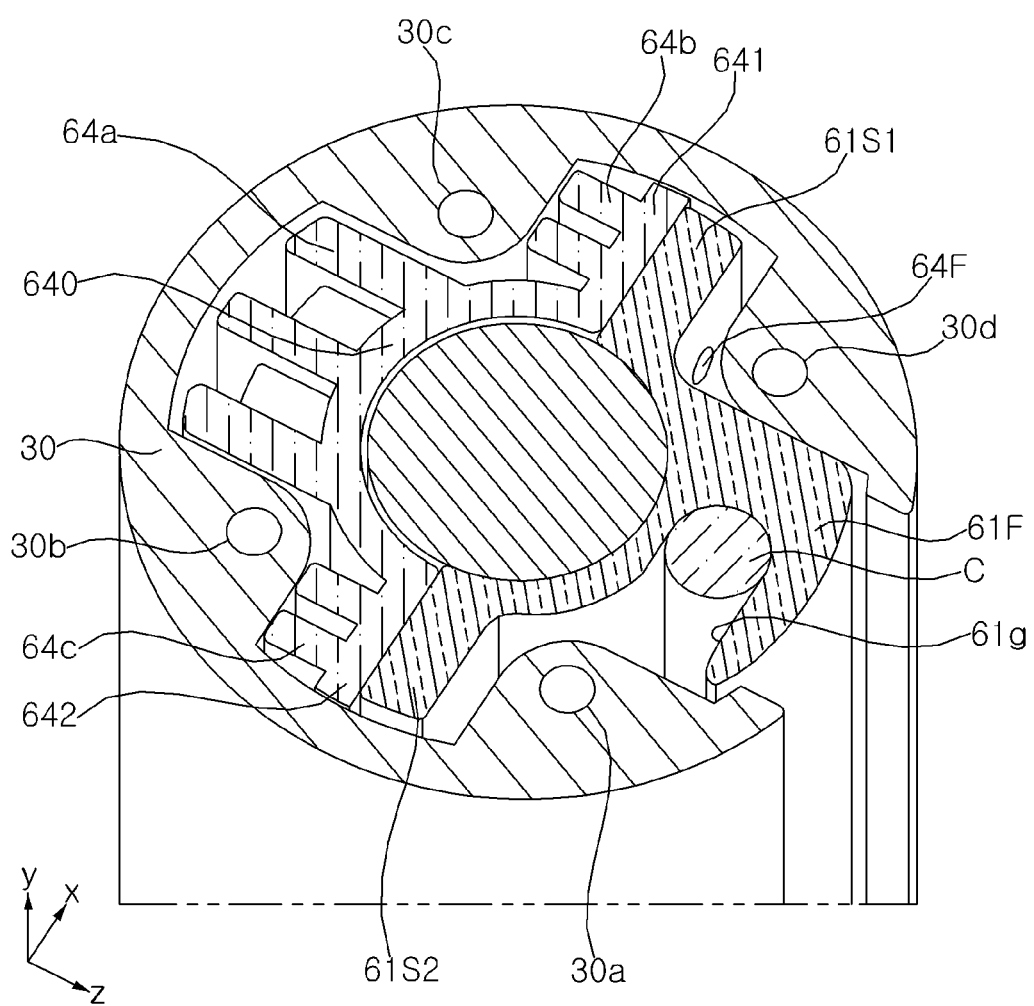

Referring to FIGS. 31 and 33, the first left flange 641 of the first clamp 64 may be located between the third rib 30c and the fourth rib 30d. The first right flange 642 of the first clamp 64 may be located between the first rib 30a and the second rib 30b. The first clamp 64 may include a first center projection 64a, a first left projection 64b, and a first right projection 64c.

The first center projection 64a may protrude toward the inside of the pole 30 from the first semi-cylinder 650 and may contact the inside of the pole 30. The first left projection 64b may protrude from the first left flange 641 toward the third rib 30c and may contact the third rib 30c. The first right projection 64c may protrude from the first right flange 642 toward the second rib 30b and may contact the second rib 30b. Accordingly, the first center projection 64a, the first left projection 64b, and the first right projection 64c may cause friction between the vertical member 61 and the pole 30.

For example, the second clamp 65 may be spaced downward from the first clamp 64 and may have the same shape as the first clamp 64. That is, the above description of the first clamp 64 may be identically applied to the second clamp 65. Accordingly, a second center projection 65a, a second left projection 65b, and a second right projection 65c of the second clamp 65 may cause friction between the vertical member 61 and the pole 30.

Accordingly, the location (height) of the vertical member 61 with respective to the base 20 may be maintained constant by the frictional force between the projection 64a, 64b, 64c, 65a, 65b, 65c and the pole 30, unless an external force of a certain level or higher is applied.

Referring to FIGS. 32 and 33, a cable groove 61g may be formed in a front portion 61F of the vertical member 61, and may be formed long in the vertical direction. A cable C may be inserted into the cable groove 61g. The cable C may be disposed along the cable groove 50c (see FIG. 15) of the arm 50 and electrically connected to the head 10. The cable C may be disposed along the stem 63s (see FIG. 31) and may be electrically connected to a battery Bt (see FIG. 1) or the like disposed inside the base 20. The battery Bt may provide power to the head 10 through the cable C. The battery Bt may be a rechargeable battery. The cable C may be a power cable and/or a signal cable. The cable C may be made of several strands.

Figure 34:
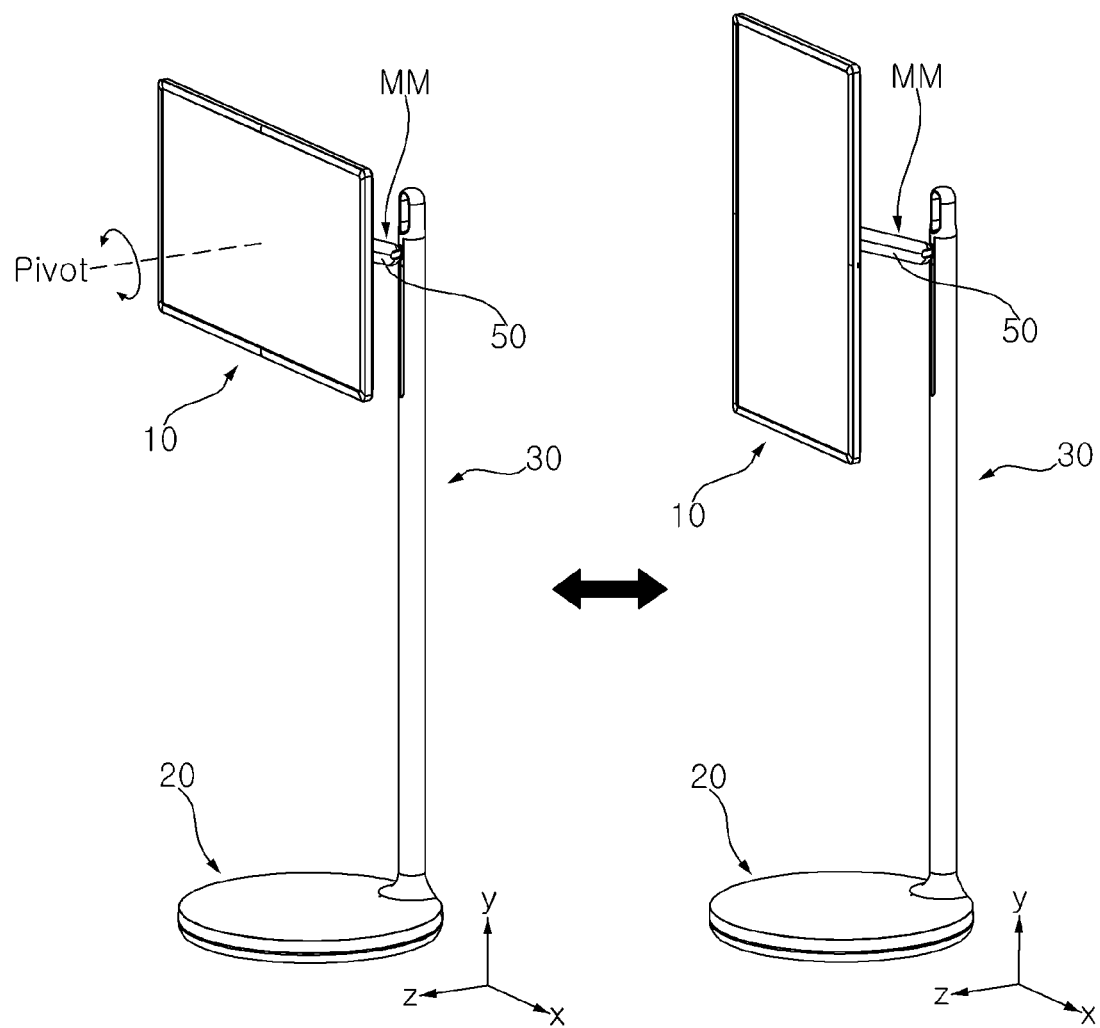

Referring to FIG. 34, the head 10 may be spaced upward from the base 20. A user may pivot the head 10. A pivot axis may pass the center of the head 10 and be orthogonal to the head 10. Referring to the left drawing of FIG. 34, the head 10 may be placed in landscape mode. Referring to the right drawing of FIG. 34, the head 10 may be placed in portrait mode.

Figure 35:
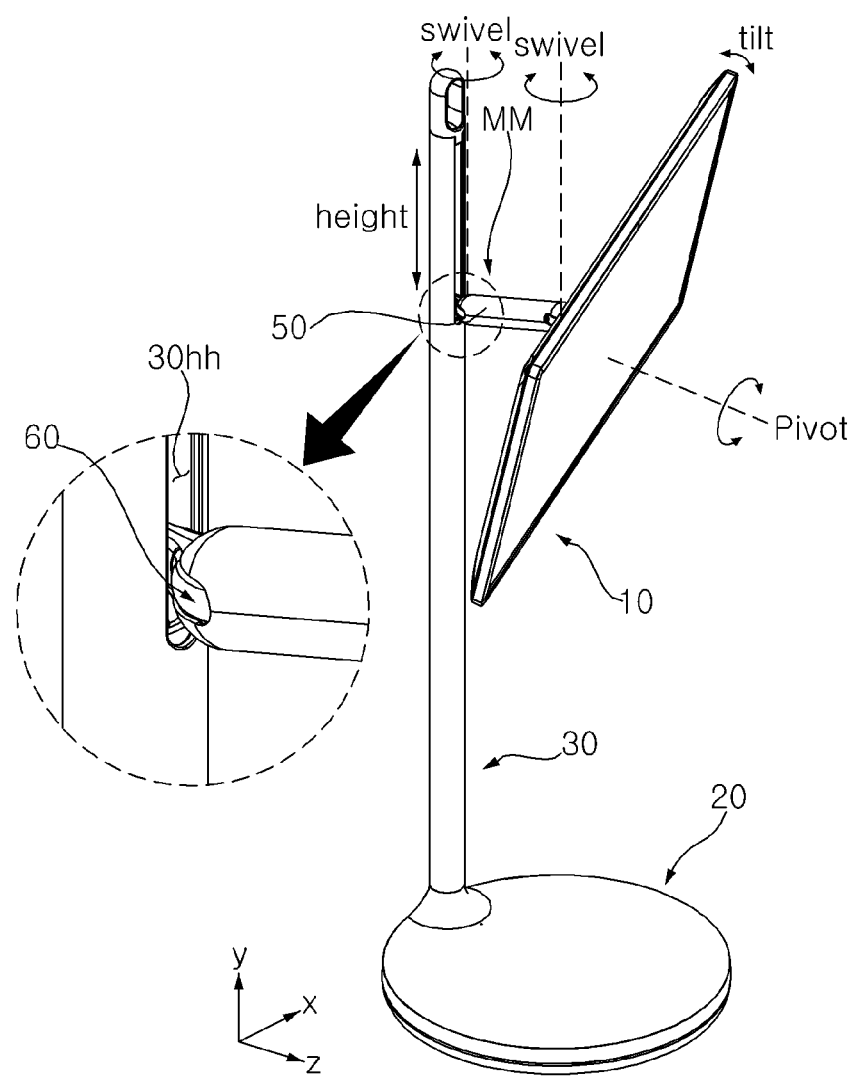

Referring to FIG. 35, a user may tilt the head 10. The tilt axis may be a horizontal axis that is located in a rear of the center of the head 10 and parallel to the head 10. A user may swivel the head 10. A first swivel axis may be a vertical axis adjacent to one end of the arm 50. A second swivel axis may be a vertical axis adjacent to the other end of the arm 50. A user may lift or lower the head 10 from the pole 30.

The aforementioned pivoting, tilting, swiveling, and elevating operations of the head 10 may be implemented independently of each other. For example, the head 10 may be pivoted within a range of +90 degrees to −90 degrees. For example, the head 10 may be tilted within a range of +25 degrees to −25 degrees. For example, the head 10 may be swiveled within a range of +65 to −65 degrees. For example, the head 10 may be located 1,065 to 1,265 mm from the base 20 or the ground based on a landscape mode.

Referring to FIGS. 1 to 35, a display device according to an aspect of the present disclosure may include: a display panel; a frame positioned behind the display panel; a back cover covering a rear of the frame and having a hole; and an articulated connector coupled to the frame through the hole of the back cover, wherein the articulated connector may include: an inner cover covering a portion of the hole of the back cover; and an outer cover positioned between a perimeter of the inner cover and a boundary of the hole of the back cover and coupled to the inner cover.

The outer cover may be detachably coupled to the inner cover. The inner cover may include an inner coupling projection which is formed at the perimeter of the inner cover and on which the cover is caught.

The articulated connector may further include a cable reel around which a cable is wound, the cable reel spaced from the boundary of the hole to an inside of the hole, wherein the inner cover may cover a rear of the cable reel and the cable reel may be fixed to the inner cover.

The display device may further include a head including the display panel, the frame, and the back cover, wherein the articulated connector may include: a pivot module rotating about a pivot axis orthogonal to the head, wherein the head may be rotatable about the pivot axis of the pivot module independently of the inner cover.

With respect to the pivot axis, an inner circumference of the outer cover and an outer circumference of the inner cover may be independent of each other, with respect to the pivot axis, an outer circumference of the outer cover and the head may be independent of each other, or with respect to the pivot axis, the inner circumference of the outer cover and the outer circumference of the inner cover may be independent of each other, and the outer circumference of the outer cover and the head may be independent of each other.

The cable may be wound on the cable reel about the pivot axis, wherein a cable path may be defined between an outer circumference of the cable reel and the boundary of the hole of the back cover, and wherein the outer cover may cover the cable path.

The inner cover may further include: a dome having a band-shaped outer circumference of a certain width; and a rim which protruding from the outer circumference of the dome in a radial direction of the dome and extending along the outer circumference of the dome, wherein the inner coupling projection may be formed at the outer circumference of the dome and may be spaced in a rearward direction from the rim, wherein an inner circumference of the outer cover may be caught on the inner coupling projection.

The outer cover may further include: an outer body having a ring shape and positioned behind the rim; a first rim protruding from an inner circumference of the outer body toward the rim and extending along the inner circumference of the outer body; and an inner coupling groove formed at one surface of the first rim facing an outer circumference of the rim and extending along the first rim, wherein the inner coupling groove may be positioned between a front end and a rear end of the first rim, ma be caught on the inner coupling projection, and may be slidable on the inner coupling projection.

The inner coupling projection may include a plurality of inner coupling projections spaced apart from each other along the outer circumference of the dome.

The inner cover may further include: an insertion groove formed at an inner circumference of the rim, the insertion groove which is formed as apart of the insertion groove penetrates the outer circumference of the dome; and a stopper protruding toward the outer body from a rear surface of the rim, wherein a distal end of the first rim may be positioned between the stopper and the insertion groove of the dome.

The display device may further include a fixing plate positioned in the hole of the back cover and coupled to the frame and the articulated connector, wherein the fixing plate may further include an outer coupling projection positioned between an outer circumference of the inner cover and the boundary of the hole of the back cover and formed at the fixing plate, wherein the outer cover may further include a second rim protruding from an outer circumference of the outer body toward the fixing plate; and an outer coupling groove which is formed at the second rim and to which the outer coupling projection is fixed.

The outer coupling groove may further include a plurality of outer coupling grooves spaced apart from each other along the outer circumference of the outer body, and wherein the outer coupling projection may further include a plurality of outer coupling projections corresponding to the plurality of outer coupling grooves.

The fixing plate may further include a rib positioned between the outer circumference of the inner cover and the boundary of the hole of the back cover, and formed at the fixing plate, wherein the outer cover further includes a slit which is formed at the second rim and into which the rib is inserted.

The display device may further include a board positioned between the frame and the back cover, and coupled to the frame; and a cable head connected to a distal end of the cable, wherein the cable head may penetrate the fixing plate and is electrically connected to the board.

The articulated connector may include: a pivot module rotating about a pivot axis orthogonal to the display panel; a tilt module rotating about a tilt axis parallel to the display panel and extending in a horizontal direction; and a first rotation unit rotating about a first swivel axis parallel to the display panel and extending in a vertical direction.

The display device may further include: a base spaced apart from the display panel; a pole extending from the base in a direction in which the display panel is spaced apart from the base; an elevating module movably coupled to the pole in a longitudinal direction of the pole; and an arm extending in a direction intersecting the display panel and the pole, having one side connected to the articulated connector, and having the other side connected to the elevating module, wherein the elevating module may include a second rotation unit rotating about a second swivel axis parallel to the pole and extending in a vertical direction, wherein the cable may extend along the arm and the pole and may be electrically connected to an electronic component disposed inside the base.

Referring to FIGS. 1 to 35, a display panel according to another aspect of the present disclosure may include a base; a head spaced apart from the base and including a display panel; a pole extending toward the head from the base; and an arm connecting the cable reel and the pole, the arm movably coupled to the pole in a longitudinal direction of the pole, wherein one side of the arm may be rotatably coupled to the head, and wherein the other side of the arm may be rotatably coupled to the pole.

A rotational axis of the one side of the arm may be a first swivel axis parallel to the display panel, and a rotational axis of the other side of the arm may be a second swivel axis parallel to the pole.

The display device may further include a cable reel which is coupled to the head and on which a cable is wound. The cable may extend along the arm and the pole. The cable may be electrically connected to an electronic component disposed inside the base.

Effects of the display device according to the present disclosure are described as follows.

According to at least one of the embodiments of the present disclosure, a display device having a stand of display panel may be provided.

According to at least one of the embodiments of the present disclosure, a structure capable of freely adjusting the angle or location of a head having a display panel may be provided.

According to at least one of the embodiments of the present disclosure, it is possible to provide a structure capable of independently implementing various motions of a display panel, such as a pivot motion, a tilt motion, a swivel motion, and an elevating motion.

According to at least one of the embodiments of the present disclosure, a structure capable of winding a cable on a cable reel of an articulated connector that implements various motions may be provided.

According to at least one of the embodiments of the present disclosure, it is possible to provide a detachable outer cover covering a cable path around a cable reel, thereby improving work convenience such as a cable dislocation.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising: a display panel; a frame positioned behind the display panel; a back cover covering a rear of the frame; an articulated connector rotatably coupled to an arm and configured to be coupled to the frame through the back cover; a cable reel having a cylindrical body disposed at the articulated connector and on which a cable is wound; an inner cover coupled to the articulated connector and covering a rear of the cable reel; and an outer cover disposed to surround the inner cover, wherein the back cover is shaped to define a position configured to accommodate the outer cover.

2. The display device of claim 1, further comprising ahead including the display panel, the frame, and the back cover,
wherein the articulated connector comprises:
a pivot module providing rotation of the head about a pivot axis orthogonal to the head,
wherein the head is rotatable about the pivot axis of the pivot module independently of the inner cover.

3. The display device of claim 2, wherein, with respect to the pivot axis, an inner circumference of the outer cover and an outer circumference of the inner cover are independent of each other,
with respect to the pivot axis, an outer circumference of the outer cover and the head are independent of each other, or
with respect to the pivot axis, the inner circumference of the outer cover and the outer circumference of the inner cover are independent of each other, and the outer circumference of the outer cover and the head are independent of each other.

4. The display device of claim 2, wherein the cable is wound on the cable reel about the pivot axis,
wherein a cable path is defined around an outer circumference of the cable reel, and
wherein the outer cover covers the cable path.

5. The display device of claim 1, wherein the outer cover further comprises a rearward protruding coupling member configured to engage with a corresponding coupling member at the position of the back cover configured to accommodate the outer cover to secure the outer cover to the back cover.

6. The display device of claim 5, wherein the rearward protruding coupling member is one of a plurality of rearward protruding coupling members spaced apart along a circumference of the outer cover to correspond with a plurality of corresponding coupling members at the position of the back cover.

7. The display device of claim 1, wherein the articulated connector comprises a front bracket,
wherein the front bracket comprises a plurality of projections configured to be secured to corresponding openings of the frame to secure the articulated connector to the frame.

8. The display device of claim 7, wherein the plurality of projections include two projections at atop of the front bracket and two projections at a bottom of the front bracket.

9. The display device of claim 8, wherein the two projections at the top of the front bracket are shaped differently than the two projections at the bottom of the front bracket.

10. The display device of claim 9, further comprising:
a board positioned between the frame and the back cover and coupled to the frame; and
a cable head electrically connected to the board and exposed at the position of the back cover configured to accommodate the outer cover to allow the cable to be connected thereto.

11. The display device of claim 1, further comprising a head including the display panel, the frame, and the back cover,
wherein the articulated connector comprises:
a pivot module providing rotating of the head about a pivot axis orthogonal to the display panel;
atilt module providing rotation of the head about atilt axis parallel to the display panel and extending in a horizontal direction; and
a first rotation unit providing rotation of the head about a first swivel axis parallel to the display panel and extending in a vertical direction.

12. The display device of claim 11, further comprising:
abase; and
a pole extending from the base,
wherein the cable extends from the display panel along the arm and the pole to be electrically connected to an electronic component disposed inside the base.

13. A display device comprising: a base; a head including a display panel;
a pole extending from the base; an arm having a first end coupled to the pole and a second end coupled to an articulated connector coupled to the head; and a cable reel having a cylindrical body coupled to the articulated connector and on which a cable is wound; an inner cover coupled to the articulated connector and covering a rear of the cable reel; and an outer cover disposed to surround the inner cover, wherein the arm is rotatably coupled to the articulated connector about a first swivel axis parallel to the display panel, and wherein the arm is rotatably coupled to the pole about a second swivel axis parallel to the pole.

14. The display device of claim 13, wherein the cable extends from the display panel along the arm and the pole to be electrically connected to an electronic component disposed inside the base.

15. The display device of claim 13, further comprising:
a frame positioned behind the display panel;
a back cover covering a rear of the frame;
wherein the back cover is shaped to define a position configured to accommodate the outer cover.

\* \* \* \* \*